US010924472B2

(12) United States Patent
He et al.

(10) Patent No.: US 10,924,472 B2
(45) Date of Patent: Feb. 16, 2021

(54) WEARABLE COMMUNICATION DEVICES FOR SECURED TRANSACTION AND COMMUNICATION

(71) Applicant: Shenzhen Huiding Technology Co., Ltd., Shenzhen (CN)

(72) Inventors: Yi He, San Diego, CA (US); Bo Pi, Carlsbad, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 984 days.

(21) Appl. No.: 14/556,060

(22) Filed: Nov. 28, 2014

(65) Prior Publication Data
US 2015/0149310 A1    May 28, 2015

Related U.S. Application Data

(60) Provisional application No. 61/910,016, filed on Nov. 27, 2013, provisional application No. 61/910,020, filed on Nov. 27, 2013.

(51) Int. Cl.
*H04L 9/32* (2006.01)
*H04L 29/06* (2006.01)
(Continued)

(52) U.S. Cl.
CPC ............ *H04L 63/083* (2013.01); *G06F 1/163* (2013.01); *G06Q 20/20* (2013.01); *G06Q 20/32* (2013.01);
(Continued)

(58) Field of Classification Search
CPC ............ G06K 9/0002; G06K 9/00053; G06K 9/00013; G06F 21/32; G06F 3/044;
(Continued)

(56) References Cited

U.S. PATENT DOCUMENTS 5,682,032 A * 10/1997 Philipp .............. G06K 7/10326
235/422
5,732,148 A    3/1998 Keagy et al.
(Continued)

FOREIGN PATENT DOCUMENTS

CN    1185065    6/1998
CN    1485789    3/2004
(Continued)

OTHER PUBLICATIONS

ECMA International, "Near Field Communication—Interface and Protocol (NFCIP-1)," 52 pages, Jun. 2013.
(Continued)

*Primary Examiner* — Florian M Zeender
*Assistant Examiner* — Milena Racic
(74) *Attorney, Agent, or Firm* — Perkins Coie LLP

(57) ABSTRACT

A wearable device for capacitive coupled communications is described. The wearable device includes capacitive sensor transceiver circuitry configured to receive a capacitive coupled signal from a host device. The capacitive coupled signal is received through a body of a user of the wearable device and is modulated to include a request for authentication data to authenticate the wearable device with the host device. The wearable device includes processing circuitry in communication with the capacitive sensor transceiver circuitry to process the received capacitive coupled signal and transmit authentication data modulated on a capacitive coupled reply signal to the host device. The capacitive coupled reply signal modulated with the authentication data is transmitted through the body of the user of the wearable device. The capacitive sensor transceiver circuitry receives another capacitive coupled signal from the host device modulated with information indicating a successful authentication of the wearable device with the host device.

20 Claims, 25 Drawing Sheets

(51) Int. Cl.

| | | |
|---|---|---|
| G06Q 20/40 | (2012.01) | |
| H04B 13/00 | (2006.01) | |
| G06Q 20/20 | (2012.01) | |
| G06Q 20/32 | (2012.01) | |
| G06F 1/16 | (2006.01) | |
| H04M 1/725 | (2021.01) | |
| H04M 1/67 | (2006.01) | |
| H04B 5/00 | (2006.01) | |
| H04W 12/00 | (2021.01) | |
| H04W 12/06 | (2021.01) | |
| H04W 4/80 | (2018.01) | |

(52) U.S. Cl.
CPC ..... *G06Q 20/327* (2013.01); *G06Q 20/40145* (2013.01); *H04B 5/0012* (2013.01); *H04B 5/0031* (2013.01); *H04B 13/005* (2013.01); *H04M 1/67* (2013.01); *H04M 1/7253* (2013.01); *H04W 12/003* (2019.01); *H04W 4/80* (2018.02); *H04W 12/06* (2013.01)

(58) Field of Classification Search
CPC ... G06F 3/0416; G06F 3/0488; H04B 13/005; H04B 5/0012; H04B 5/0031; H04B 5/0043; A61B 5/0028; A61B 5/0024; B60R 25/2027; G06Q 20/4012; H04L 63/083
See application file for complete search history.

(56) References Cited

U.S. PATENT DOCUMENTS

| | | | |
|---|---|---|---|
| 5,796,827 A | 8/1998 | Coppersmith et al. | |
| 5,914,701 A * | 6/1999 | Gersheneld | G06F 3/017 340/13.31 |
| 6,011,859 A | 1/2000 | Kalnitsky et al. | |
| 6,501,846 B1 | 12/2002 | Dickinson et al. | |
| 6,771,161 B1 * | 8/2004 | Doi | B60R 25/2027 340/10.34 |
| 7,751,595 B2 | 7/2010 | Russo | |
| 8,970,347 B2 * | 3/2015 | Ueno | G07C 9/37 340/5.82 |
| 8,994,498 B2 * | 3/2015 | Agrafioti | G06F 21/40 340/5.82 |
| RE45,601 E | 7/2015 | Dean et al. | |
| 9,396,378 B2 * | 7/2016 | Holz | G06F 21/32 |
| 9,606,682 B2 * | 3/2017 | Walley | H04B 13/005 |
| 2001/0025532 A1 | 10/2001 | Kramer | |
| 2003/0055785 A1 | 3/2003 | Lahiri | |
| 2003/0184430 A1 * | 10/2003 | Kumar | G06F 21/35 340/5.2 |
| 2005/0008197 A1 | 1/2005 | Dennis | |
| 2005/0053264 A1 | 3/2005 | Amano et al. | |
| 2005/0123177 A1 | 6/2005 | Abiko | |
| 2005/0221798 A1 | 10/2005 | Sengupta et al. | |
| 2005/0263596 A1 | 12/2005 | Nelson et al. | |
| 2007/0232929 A1 | 10/2007 | Kilgore et al. | |
| 2007/0299322 A1 | 12/2007 | Miyajima et al. | |
| 2008/0122803 A1 | 5/2008 | Izadi et al. | |
| 2009/0083847 A1 | 3/2009 | Fadell et al. | |
| 2009/0083850 A1 | 3/2009 | Fadell et al. | |
| 2009/0088197 A1 | 4/2009 | Stewart | |
| 2009/0252384 A1 | 10/2009 | Dean et al. | |
| 2009/0252386 A1 | 10/2009 | Dean et al. | |
| 2010/0009658 A1 * | 1/2010 | Wu | H04M 1/673 455/411 |
| 2010/0066664 A1 * | 3/2010 | Son | G06F 3/017 345/156 |
| 2010/0137107 A1 * | 6/2010 | Jamsa | A61B 5/6831 482/8 |
| 2010/0148068 A1 | 6/2010 | Schwaneberg et al. | |
| 2010/0162177 A1 * | 6/2010 | Eves | G06F 3/017 715/863 |
| 2010/0201485 A1 | 8/2010 | Chou | |
| 2010/0220900 A1 | 9/2010 | Orsley | |
| 2010/0297944 A1 * | 11/2010 | Lee | G08C 17/00 455/41.2 |
| 2011/0022025 A1 * | 1/2011 | Savoie | H04B 13/005 604/500 |
| 2011/0102346 A1 | 5/2011 | Orsley et al. | |
| 2011/0102567 A1 | 5/2011 | Erhart | |
| 2011/0152637 A1 * | 6/2011 | Kateraas | A61B 5/681 600/301 |
| 2011/0227856 A1 * | 9/2011 | Corroy | H04B 13/005 345/173 |
| 2011/0269601 A1 * | 11/2011 | Nelson | A47C 31/126 482/8 |
| 2011/0317886 A1 | 12/2011 | Matsuoka | |
| 2012/0050988 A1 | 3/2012 | Rothkopf et al. | |
| 2012/0090757 A1 | 4/2012 | Buchan et al. | |
| 2012/0242635 A1 | 9/2012 | Erhart et al. | |
| 2012/0258773 A1 | 10/2012 | Alvarez Rivera et al. | |
| 2013/0097079 A1 | 4/2013 | Bruder | |
| 2013/0108124 A1 | 5/2013 | Wickboldt et al. | |
| 2013/0119133 A1 * | 5/2013 | Michael | H04B 11/00 235/439 |
| 2013/0129162 A1 | 5/2013 | Cheng et al. | |
| 2013/0129163 A1 | 5/2013 | Chung et al. | |
| 2013/0135223 A1 * | 5/2013 | Shai | G06F 3/014 345/173 |
| 2013/0142363 A1 * | 6/2013 | Amento | H04R 25/554 381/151 |
| 2013/0169590 A1 | 7/2013 | Wickboldt et al. | |
| 2013/0177220 A1 | 7/2013 | Erhart et al. | |
| 2013/0181949 A1 | 7/2013 | Setlak | |
| 2013/0194071 A1 | 8/2013 | Slogedal et al. | |
| 2013/0211291 A1 | 8/2013 | Tran | |
| 2013/0231046 A1 | 9/2013 | Pope et al. | |
| 2013/0257804 A1 * | 10/2013 | Vu | G06F 3/044 345/174 |
| 2013/0258086 A1 | 10/2013 | Erhart et al. | |
| 2013/0259329 A1 | 10/2013 | Wickboldt et al. | |
| 2013/0265137 A1 | 10/2013 | Nelson et al. | |
| 2013/0307818 A1 | 11/2013 | Pope et al. | |
| 2014/0002237 A1 | 1/2014 | Infante et al. | |
| 2014/0035884 A1 * | 2/2014 | Oh | G06F 3/03545 345/179 |
| 2014/0093145 A1 | 4/2014 | Feekes | |
| 2014/0103943 A1 | 4/2014 | Dunlap et al. | |
| 2014/0139978 A1 | 5/2014 | Kwong | |
| 2014/0216914 A1 | 8/2014 | Pope et al. | |
| 2014/0268516 A1 | 9/2014 | Fathollahi et al. | |
| 2014/0270413 A1 | 9/2014 | Slaby et al. | |
| 2014/0313154 A1 * | 10/2014 | Bengtsson | H04B 13/005 345/174 |
| 2014/0333328 A1 | 11/2014 | Nelson et al. | |
| 2015/0071509 A1 | 3/2015 | Myers | |
| 2015/0128094 A1 * | 5/2015 | Baldwin | G06F 3/017 715/863 |
| 2015/0146944 A1 | 5/2015 | Pi et al. | |
| 2015/0150116 A1 * | 5/2015 | Baldwin | H04L 63/0853 726/16 |
| 2015/0169932 A1 | 6/2015 | Riedijk et al. | |
| 2015/0185954 A1 | 7/2015 | Chang | |
| 2015/0195007 A1 | 7/2015 | He et al. | |
| 2015/0199950 A1 * | 7/2015 | Heiman | H04R 1/1083 381/71.1 |
| 2015/0242675 A1 | 8/2015 | Pope et al. | |
| 2015/0363629 A1 | 12/2015 | Lee et al. | |
| 2016/0004899 A1 | 1/2016 | Pi et al. | |
| 2016/0224816 A1 | 8/2016 | Smith et al. | |
| 2016/0344767 A1 * | 11/2016 | Baldwin | G06F 21/32 |
| 2017/0077974 A1 * | 3/2017 | Aoki | G06F 1/163 |

FOREIGN PATENT DOCUMENTS

| | | |
|---|---|---|
| CN | 1668245 | 9/2005 |
| CN | 102239655 | 11/2011 |
| CN | 102831410 | 12/2012 |
| CN | 103425965 | 12/2013 |
| CN | 105981039 | 9/2016 |

(56) References Cited

FOREIGN PATENT DOCUMENTS

| EP | 1096722 | 5/2001 |
|---|---|---|
| EP | 1353292 | 10/2011 |
| KR | 10-2011-0002373 | 1/2011 |
| KR | 10-1010344 | 1/2011 |
| KR | 10-2012-0124369 | 11/2012 |
| KR | 2012-0140016 A | 12/2012 |
| KR | 10-20130111464 | 10/2013 |
| WO | 0159692 | 8/2001 |
| WO | WO-2013053923 A1 * | 4/2013 |
| WO | 2015/077733 A1 | 5/2015 |
| WO | 2016/007444 A1 | 1/2016 |

OTHER PUBLICATIONS

International Search Report and Written Opinion dated Oct. 5, 2015 for International Application No. PCT/US2015/039273, filed on Jul. 6, 2015 (11 pages).

International Search Report and Written Opinion dated Mar. 10, 2015 for International Application No. PCT/US2014/067195, filed on Nov. 24, 2014 (8 pages).

International Search Report and Written Opinion dated Apr. 16, 2015 for International Application No. PCT/U2014/067828, filed on Nov. 28, 2014 (11 pages).

Supplementary European Search Report from corresponding EP Application No. 14866421 dated Mar. 23, 2017 (6 pages).

Extended European Search Report from corresponding EP Application No. 14864337.2 dated Jan. 31, 2017 (9 pages).

Korean Office Action from corresponding Korean Patent Application No. 10-2016-7015359 dated Jun. 24, 2017, (13 pages). (English translation not currently available).

Korean Office Action from corresponding Korean Patent Application No. 10-2016-7017169 dated Jan. 22, 2018, (8 pages). (English translation not currently available).

Korean Office Action from corresponding Korean Patent Application No. 10-2016-7027198 dated Aug. 2, 2017, (9 pages). (English translation not currently available).

Chinese Office Action from corresponding Chinese Patent Application No. 201480065208.X dated Feb. 1, 2018, (8 pages). (English translation not currently available).

Chinese Office Action from corresponding Chinese Patent Application No. 201580015697.2 dated Jul. 24, 2018, (11 pages). (English translation not currently available).

Chinese Office Action from corresponding Chinese Patent Application No. 201480064040.0 dated Oct. 17, 2018, (8 pages). (English translation not currently available).

Chinese Office Action from corresponding Chinese Patent Application No. 201510012966.1 dated Apr. 1, 2019 (English translation not currently available).

Pi, Bo et al. U.S. Appl. No. 15/806,294 Notice of Allowance dated Aug. 23, 2019.

Indian Examination Report dated Feb. 14, 2020 for Indian Patent Application No. 201617021885 (5 pages).

* cited by examiner

Shoe implementation of sensor and HBN devices. Two position options of the capacitive coupling conductors, one in the sole, one in the bottom of shoe and with embedded electronics and sensor.

Smartphone communicate with wearable device which is preregister with the smartphone, the transaction application on smartphone can pre authorized a amount of money to wearable device.

WEARABLE COMMUNICATION DEVICES FOR SECURED TRANSACTION AND COMMUNICATION

CROSS REFERENCE TO RELATED APPLICATIONS

This patent document claims the benefits and priorities of U.S. Provisional Patent Application No. 61/910,016, filed on Nov. 27, 2013, and U.S. Provisional Patent Application No. 61/910,020, filed on Nov. 27, 2013. The entire contents of the before-mentioned patent applications are incorporated by reference as part of the disclosure of this document.

BACKGROUND

This patent document relates to techniques, devices and systems for exchanging information and establishing communications between two or more communication devices via capacitive coupling where one of the devices is a wearable device worn by a user.

A capacitive sensor is a sensing device based on one or more capacitors which are coupled to a sensor circuit that applies an electrical signal to the one or more capacitors and measures the variation of signal due to a change that occurs at the one or more capacitors. This change can reflect one or more variations that affect the operation of the one or more capacitors, e.g., a change in relative spacing between two electrodes of a capacitor, a change in the relative position or overlap between two electrodes of a capacitor, a change in the dielectric material that affects the capacitance of a capacitor or a change in the electric field that affects the capacitance of a capacitor. Capacitor sensors can be configured to measure various parameters, such as motion, material composition, touch, object proximity, pressure, acceleration, and so on.

Some computers and communication devices use touch screens based on a 2-dimensional array of capacitor sensors to allow users to interact with the computers or devices by touching the touch screens. Various mobile phones and portable devices such as tablets use capacitor sensor touch screens to provide user friendly and intuitive user I/O interfaces for operating the mobile phones and portable devices.

SUMMARY

The systems, devices and techniques disclosed in this document provide device-to-device communications via a human body of a user between (1) a capacitor sensor touch screen device that includes a capacitor sensor touch screen that includes capacitor sensors and provides a display function and (2) a capacitor sensor device that includes one or more capacitor sensors that detect or sense, based on capacitive sensing and without providing a display function, signals transmitted from the capacitor sensor touch screen of the capacitor sensor touch screen device. The human body of a user operates as a signal transmitting medium or channel between the capacitor sensor touch screen device capacitor sensor device without a display function to transmit signals between the two devices in communications.

In addition, the systems, devices and techniques disclosed in this patent document can provide device-to-device communications via a human body of a user or direct device-to-device coupling between two capacitor sensor touch screen devices each including capacitor sensor touch screen that includes capacitor sensors and optionally a display function.

In one aspect a wearable device for capacitive coupled communications is described. The wearable device includes capacitive sensor transceiver circuitry configured to receive a capacitive coupled signal from a host device. The capacitive coupled signal is received through a body of a user of the wearable device and is modulated to include a request for authentication data to authenticate the wearable device with the host device. The wearable device includes processing circuitry in communication with the capacitive sensor transceiver circuitry to process the received capacitive coupled signal and transmit authentication data modulated on a capacitive coupled reply signal to the host device. The capacitive coupled reply signal modulated with the authentication data is transmitted through the body of the user of the wearable device. The capacitive sensor transceiver circuitry receives another capacitive coupled signal from the host device modulated with information indicating a successful authentication of the wearable device with the host device.

The wearable device can be implemented in various ways to include one or more of the following features. The capacitive sensor transceiver circuitry can communicate, using capacitive coupled signaling, with a point of sales (POS) terminal to process a transaction. The wearable device can include a display screen to present information to the user. The authentication data can include encrypted ID and password information. The wearable device can include a smartwatch worn on a wrist of the user. The wearable device can be attached to a belt worn by the user. The wearable device can be included in a shoe worn by the user. The wearable device can be included in an article which is attached to the user. The wearable device can include at least one other sensor configured to collect sensor data. The at least one other sensor can measure a biological parameter of the user. The biological parameter of the user can include a temperature of the user. The biological parameter of the user can include a blood pressure of the user. The biological parameter of the user can include a body pulse rate of the user. The at least one other sensor can measure a motion parameter of the user.

In another aspect, a method performed by a wearable device for capacitive coupled communications is described. The method includes detecting, by the wearable device, a signal sent from a host device through a user's body using a capacitive coupling channel. The received signal is modulated with a request to authenticate the wearable device with the host device. The method includes responsive to detecting the signal sent from the host device, transmitting, by the wearable device, a reply signal modulated with authentication data that includes encrypted ID and password information. The reply signal is transmitted through the user's body using capacitive coupling. The method includes receiving, by the wearable device, a confirmation signal from the host device modulated with information confirming a successful authentication of the wearable device with the host device.

The method can be implemented in various ways to include one or more of the following features. The method can include responsive to receiving the confirmation signal, stopping, by the wearable device, transmission of the authentication data. The method includes communicating, using capacitive coupled signaling, with a point of sales (POS) terminal to process a transaction. Communicating, using capacitive coupled signaling, with a point of sales (POS) terminal to process a transaction can include sending authentication information to the POS terminal for verification. Communicating, using capacitive coupled signaling, with a point of sales (POS) terminal to process a transaction can include receiving, by the wearable device, confirmation from the POS terminal indicating a successful verification of the authentication information. The method can include receiving from the host device an authorization for the wearable device to spend up to a certain amount of money.

In another aspect, a mobile device for secure communications is described. The mobile device includes a capacitor sensor touch screen to perform capacitive sensing. The mobile device includes a fingerprint sensor to identify a fingerprint of an authorized user of the mobile device. The mobile device includes capacitive sensor transceiver circuitry in communication with the capacitive sensor touch screen to establish a device-to-device connection with another device via capacitive coupling through a body of a user touching the smartphone. Establishing a device-to-device connection includes transmitting a capacitive coupled signal generated by the capacitor sensor touch screen to the other device. The generated capacitive coupled signal is modulated with data.

The mobile device can be implemented in various ways to include one or more of the following features. The data can include authentication information. The authentication information can include encrypted ID and password. The capacitive sensor transceiver circuitry can transmit information to initiate a secured transaction with the other device via the device-to-device connection. The capacitive coupled signal generated by the capacitor sensor touch screen can include a fingerprint data identified by the fingerprint sensor.

In another aspect, a method performed by a mobile device to transmit a signal to another device through capacitive coupling is described. The method includes generating, by a capacitive sensor touch screen of the mobile device, a device-to-device connection initiation signal and a touch screen signal that represents user interface with the capacitive sensor touch screen. The method includes assigning the device-to-device communication signal and the touch screen signal to different time slots in a time division multiplexing scheme. The method includes transmitting, by capacitive sensor transceiver circuitry, the device-to-device communication signal to the other device using a body of a user of the mobile device as a capacitive coupled communication channel. The method includes receiving an acknowledgement to the transmitted device-to-device communication signal from the other device. The method includes responsive to the received acknowledgment signal, transmitting to the other device an acknowledgment back signal that is multiplexed in time with the touch screen signal.

The method can be implemented in various ways to include one or more of the following features. The method can include modulating information for device-to-device communication based on a frequency modulation protocol for device-to-device signaling between the mobile device and the other device using the body of a user of the mobile device as the capacitive coupled communication channel.

DETAILED DESCRIPTION

A capacitive touch panel or capacitor sensor touch screen can be used to provide a user input/output/(I/O) interface and a display panel in various electronic or communication devices such as mobile phones including smart phones, tablet computers, electronic readers, portable computers, laptop computers, desktop computers and other electronic devices. Low frequency electrical signals from a capacitive touch panel or capacitor sensor touch screen can be coupled to a human body, and another device that is attached to, in contact with, or in the proximity of the human body to be capacitively coupled to the human body can pick up such signals. This mechanism can be used to provide device-to-device communications via the human body, e.g., using a capacitive touch panel of a smart phone to transmit data and another device to detect the data sent from the smart phone or conversely, using the smart phone to receive data or information from the other device.

Figure 1A:
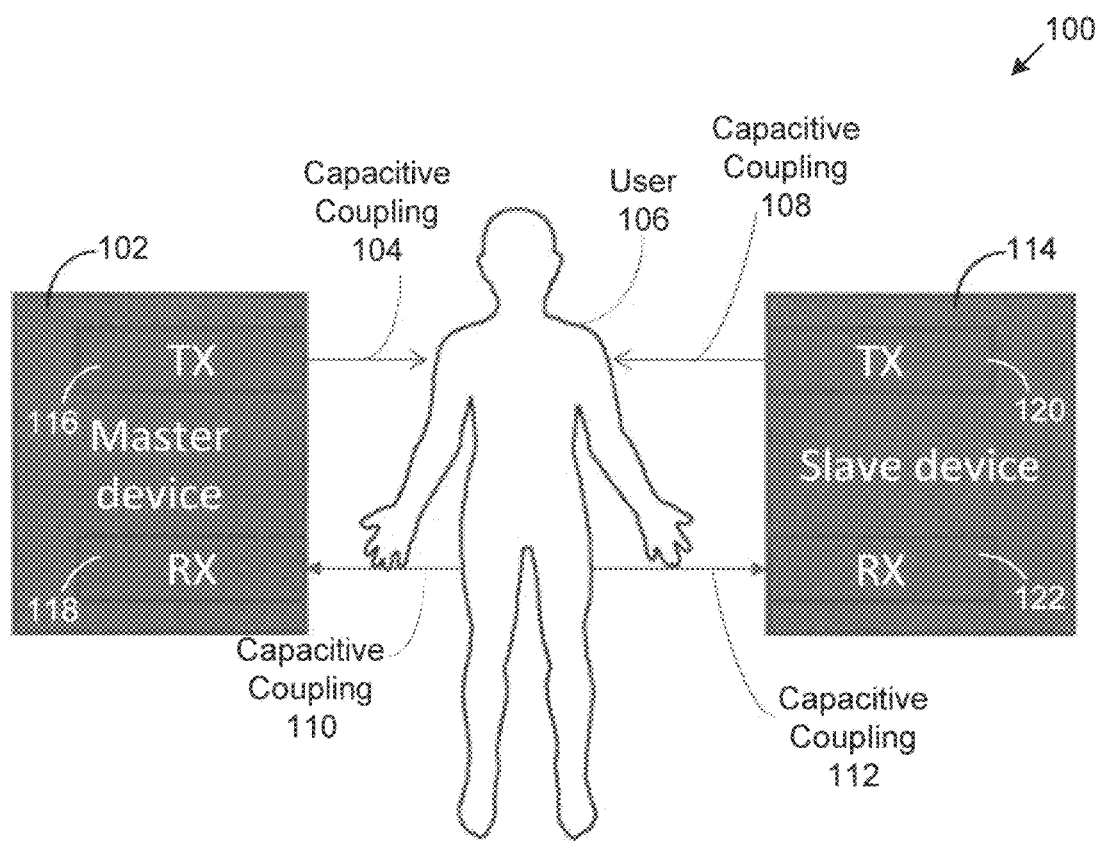
FIG. 1A shows an example of a device-to-device communication system via a user's body between a master device and a slave device.

FIG. 1A shows an example of a device-to-device communication system 100 via a user's body between a master device 102 and a slave device 114. In this particular example, the mast device 102 and the slave device 114 include a capacitive sensor transceiver 102 and 114 for master and slave devices respectively. Each of the capacitive sensor transceivers 102 and 114 includes a transmitter (TX) 116 or 120 for sending a signal via capacitive coupling 104 or 106 with the human body and a receiver (RX) 118 or 122 that receives a signal from the other device via capacitive coupling 110 or 112 with the human body 106. In some applications, one of the devices, e.g., the slave device 114, can be a transmitter-only device that transmits certain information or data, e.g., a sensor signal from a sensor in the slave device, to the master device 102 which may be a receiver-only device in some applications and may be a transceiver device in other applications. The master device 102 in FIG. 1A is a capacitor sensor touch screen device that includes a capacitor sensor touch screen having capacitor sensors to provide a display function for displaying information to a user, a touch panel user I/O interface for the user to operate and interact with the master device, and a device-to-device communication interface for detecting or sensing a device-to-device communication signal from the slave device and, in some implementations, for sending a device-to-device communication signal to the slave device. The slave device 114 in FIG. 1A is a capacitor sensor device that includes one or more capacitor sensors that detect or sense, based on capacitive sensing and without providing a display function, signals transmitted from the capacitor sensor touch screen of the capacitor sensor touch screen device. In some implementations, the slave device FIG. 1A, although having one or more capacitor sensors capable of transmitting or receiving capacitive coupled device-to-device communication signaling, can be a lesser device in some aspect than the master device. For example, the slave device 114 may not have a display function to display information to a user while the master device 102 has a fully functional display such as a touch screen as in various smartphones or tablet computers.

Figure 1B:
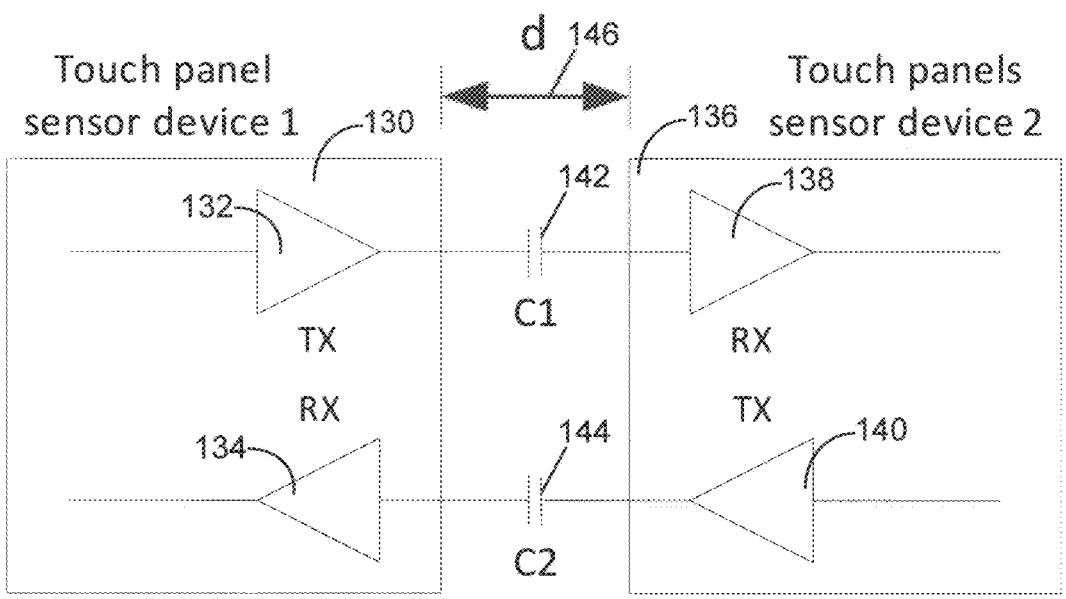
FIG. 1B shows a specific example of the master device in FIG. 1A as a touch panel sensor device 1 with transmitter (TX) and receiver (RX) functions via a touch panel for capacitive coupling and with a display function and the slave device in FIG. 1A as a touch panel sensor device 2 with TX and RX functions via its own touch panel for capacitive coupling without a display function.

FIG. 1B shows a specific example of the master device 102 in FIG. 1A as a touch panel sensor device 1 (130) with TX 132 and RX 134 functions via a touch panel for capacitive coupling and with a display function and the slave device 114 in FIG. 1A as a touch panel sensor device 2 (136) with TX 140 and RX 138 functions via its own touch panel for capacitive coupling without a display function. The capacitive coupling for transmitting a signal from the master 130 to the slave 136 is represented by an effective capacitance C1 (142) and the capacitive coupling for transmitting a signal from the slave 136 to the master 130 is represented by an effective capacitance C2 (144). The master device 130 may be a smart phone with a capacitive touch panel, or a special capacitive coupling antenna. The slave device 136 may be an electronics device attached to the body of a user such as a wrist watch or device, a sensor in shoe or a sensor attached to a belt worn by the user. The master device can be operated to send low frequency electrical signals (e.g., between a few kHz to a few hundreds of kHz) modulated with data information coupled to human body through capacitive coupling (TX) 132 or 140. The slave device 136 may have a receiving circuit connected to a capacitive coupled electrodes to receive the signals from master device. The slave device 136 may include processing circuitry that demodulates and decodes the received data signals from the master. Conversely, the slave device 136 can also send signals via capacitive coupling to the master device 130 which demodulates and decodes the received signals from the slave device 136.

Figure 2A:
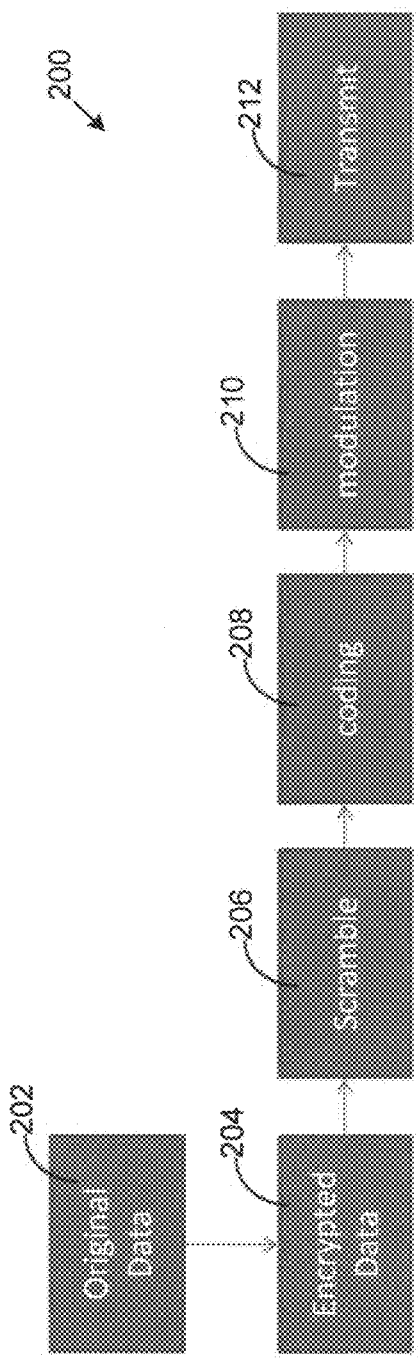
FIG. 2A shows an example of the signal chain for transmitting a device-to-device signal from a transmitter (TX) in either the master device or the slave device in FIG. 1A and FIG. 1B.

FIG. 2A shows an example of the signal chain (200) for transmitting a device-to-device signal from a transmitter (TX) in either the master device 102 or the slave device 114 in FIG. 1A and FIG. 1B. In this example, the transmitter includes a data encryption module that encrypts the original data 202 into encrypted data 204, a data scrambling module that scrambles 206 the encrypted data, a data coding module that encodes 208 the output data from the data scrambling module, a signal modulator that modulates 210 the encoded data produced by the data coding module onto a low frequency signal carrier for transmission, and a signal transmitter module that transmits 212 the modulated signal via the capacitor sensors or the touch screen panel.

Figure 2B:
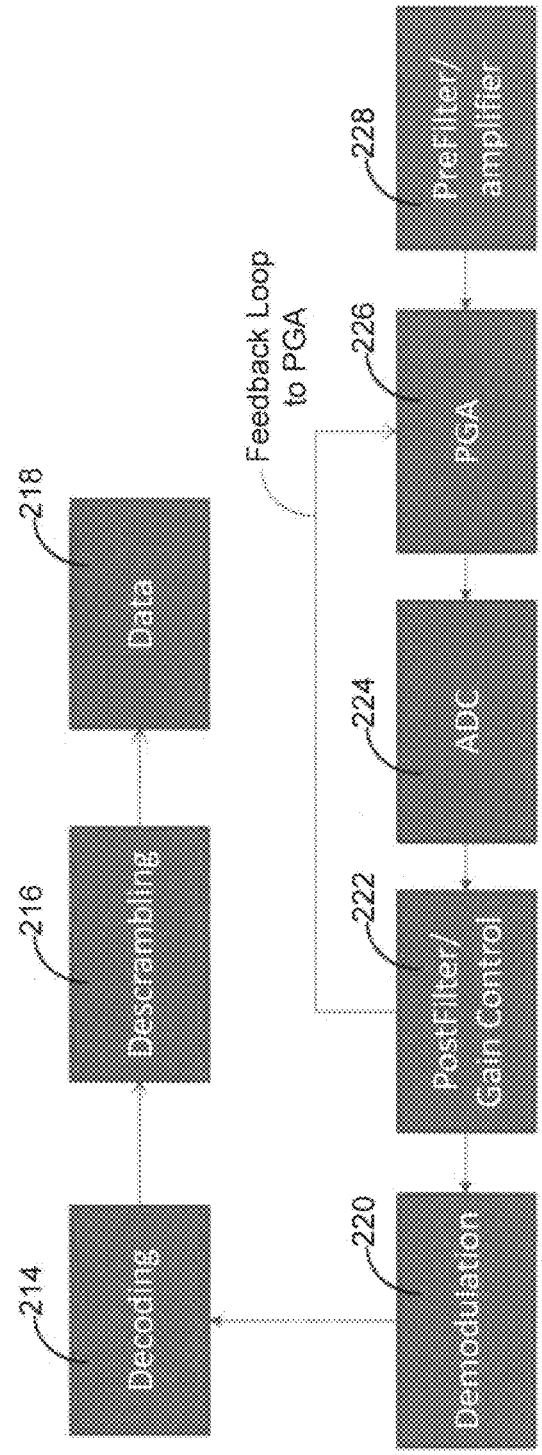
FIG. 2B shows an example of the signal chain for receiving a device-to-device signal by a receiver (RX) in either the master device or the slave device in FIG. 1A and FIG. 1B.

FIG. 2B shows an example of the signal chain for receiving a device-to-device signal by a receiver (RX) in either the master device or the slave device in FIG. 1A and FIG. 1B. In this example, the receiver includes a front receiver module having a pre filter and an amplifier 228 for filtering and amplifying a received device-to-device communication signal, a programmable gain amplifier (PGA) module 226 for preconditioning the output from the front receiver module for processing the analog-to-digital conversion (ADC) module 224, and a post-filter/gain control module 222 coupled to receive the output of the ADC module with a feedback to the PGA module, a demodulation module 220 that demodulates the output signal, a decoding module 214 that decodes the demodulated signal produced by the demodulation module, and a descrambling module 216 that descrambles the decoded output from the decoding module to produce the extracted data 218.

Notably, the device-to-device capacitive coupling communications can be implemented in ways that the device-to-device capacitive coupling communications function can share all or significant portion of the existing circuitry for the touch panels in smart phones and tablet computers. This use of the existing circuitry for the touch panels in smart phones and tablet computers allows the present device-to-device capacitive coupling communications to be added without significant increase in device real estate and complication of the device hardware. In comparison with some existing device-to-device communication methods (e.g., RF device to device communications under the Bluetooth and IR device to device communications), the present device-to-device capacitive coupling communications eliminate the need for completely separate hardware modules and can significantly reduce the power consumption of the device which is an important aspect of mobile electronic devices.

Referring back to FIGS. 1A and 1B, a master device 102 and a slave device 114 can form an ad hoc device-to-device communication network via proper handshake communication protocol. Various ad hoc device-to-device communication protocols may be implemented.

Figure 3:
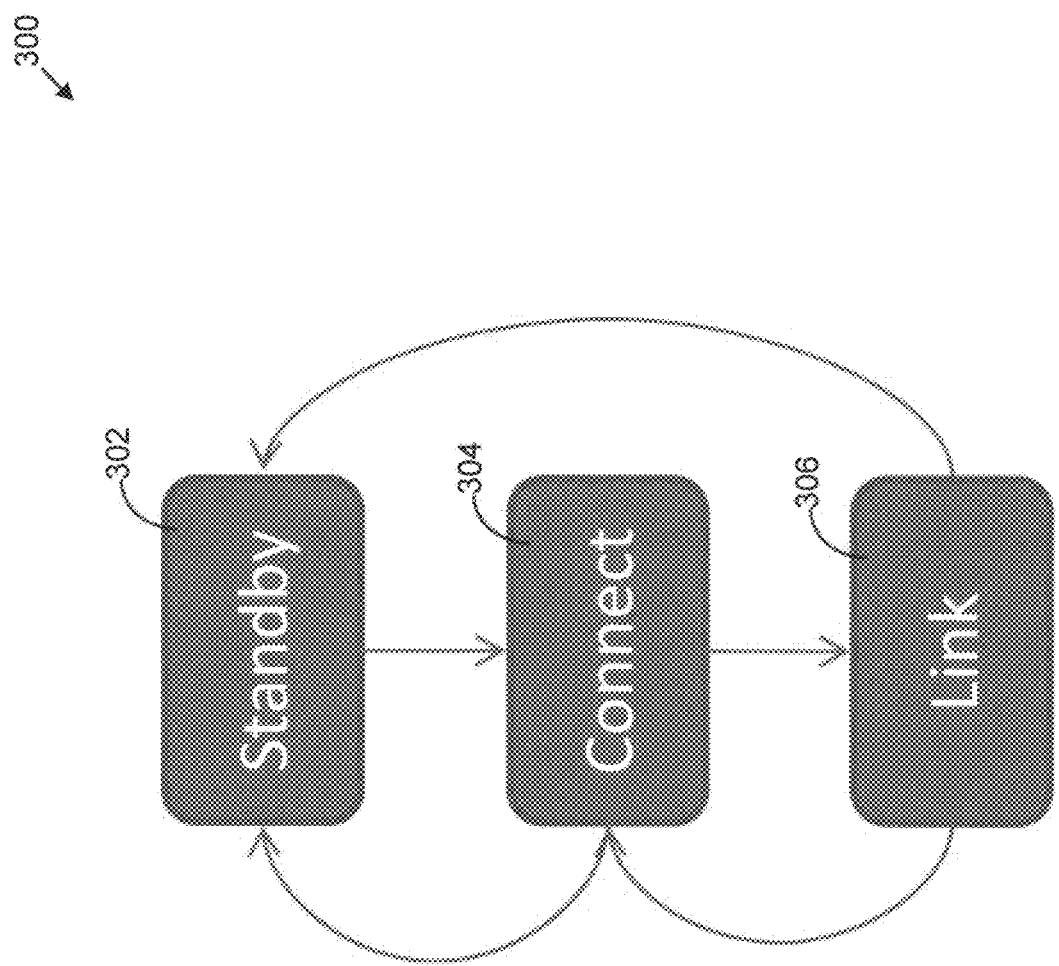
FIG. 3 shows an example of device-to-device communications for establishing such ad hoc device-to-device communications between the master device and the slave device.

FIG. 3 shows an example of device-to-device communications for establishing such ad hoc device-to-device communications between the master device 102 and the slave device 114 (300). Prior to establishing ad hoc device-to-device communications, each device (master or slave) is configured to include circuitry that operates the device in a standby mode 302 capable of detecting signals from other devices for initiating ad hoc device-to-device communications. In this context, a device that initiates ad hoc device-to-device communications is a master device and sends out an initiation signal, e.g., a frequency periodic wave signal as a frequency modulation (FM) signal (e.g., a sine/cos wave signal, a triangular wave signal or square wave signal). A slave device detects this FM signal from the master device and, in response, sends the master device an acknowledgement signal with an ACK frame. Next, the master device detects the ACK frame and sends another acknowledgement signal (ACK) to the slave device. After sending this ACK signal to the slave device, the master device switches to a connected state (304) with the slave device. On the slave device side, upon receiving and detecting the ACK from the master device, the slave device switches to a connected state with the master device. At this time, the master device and the slave device establish ad hoc device-to-device communications link (306).

Figure 4:
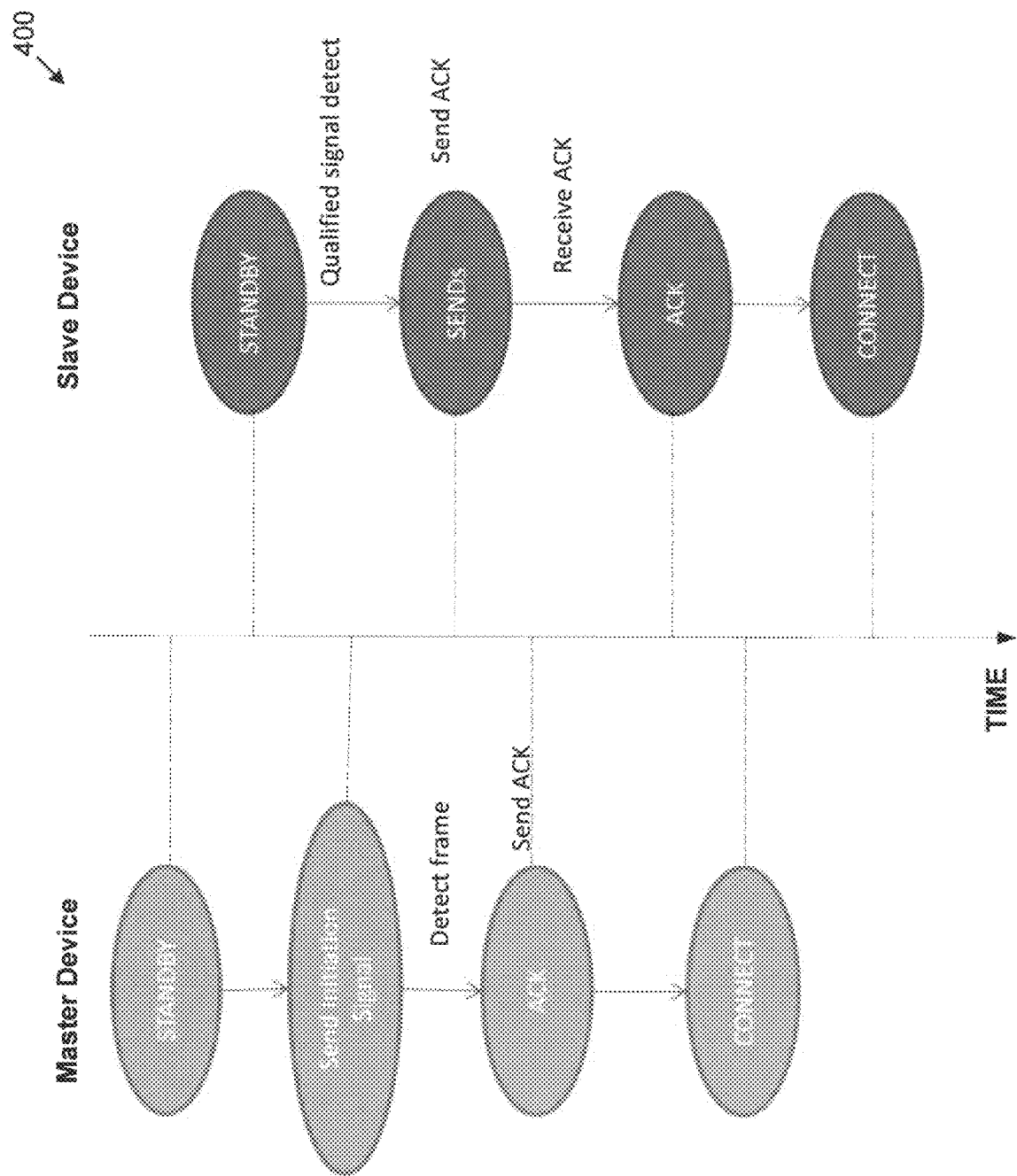
FIGS. 4 and 5 show some details of the sequence of operations by the master device and the slave device in the example in FIG. 3.
Figure 5:
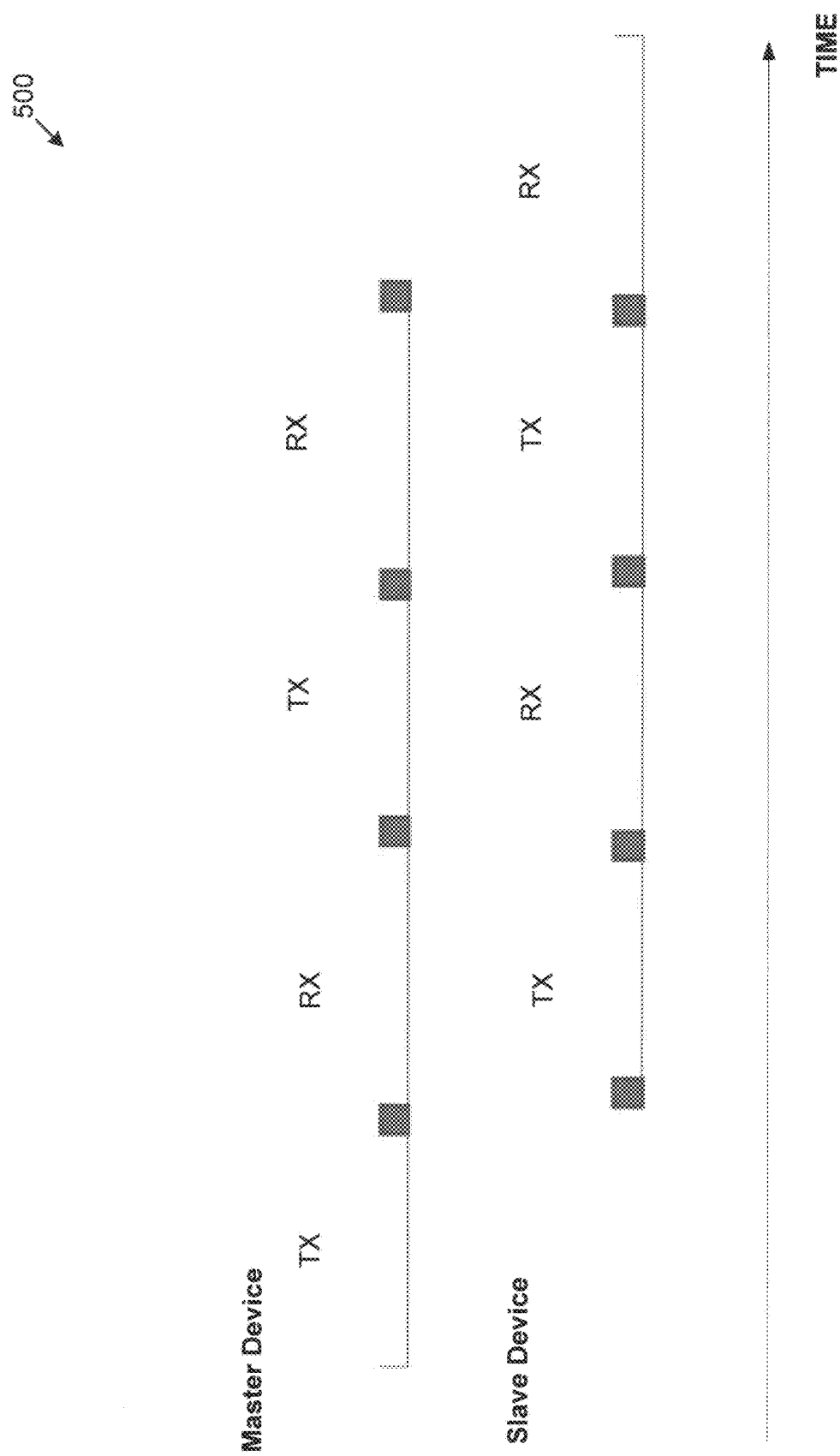

FIGS. 4 and 5 show an exemplary sequence of operations performed by a master device and a slave device as shown in the example of FIG. 3. FIG. 4 shows examples of some operating states (400) of the master and slave devices and their relationships. FIG. 5 shows some examples of the time slots of actions by the master and slave devices, respectively (500). This time-division multiplexed communications may be implemented in various specific time allocations. For example, in some implementations, the master device may be allocated with a time slot of around 2 ms for sending out the initiation signal, a time slot of around 2 ms total for sending out the master ACK signal that includes a periodic wave signal in a time slot of around 1 ms and another time slot of around 1 ms for the master signal (e.g., PN11 signaling under IEEE 802.11b); and the slave device may be allocated with a time slot of around 2 ms for the slave ACK signal that includes a periodic wave signal in a time slot of around 1 ms and another time slot of around 1 ms for the slave PN11 signal.

Figure 6:
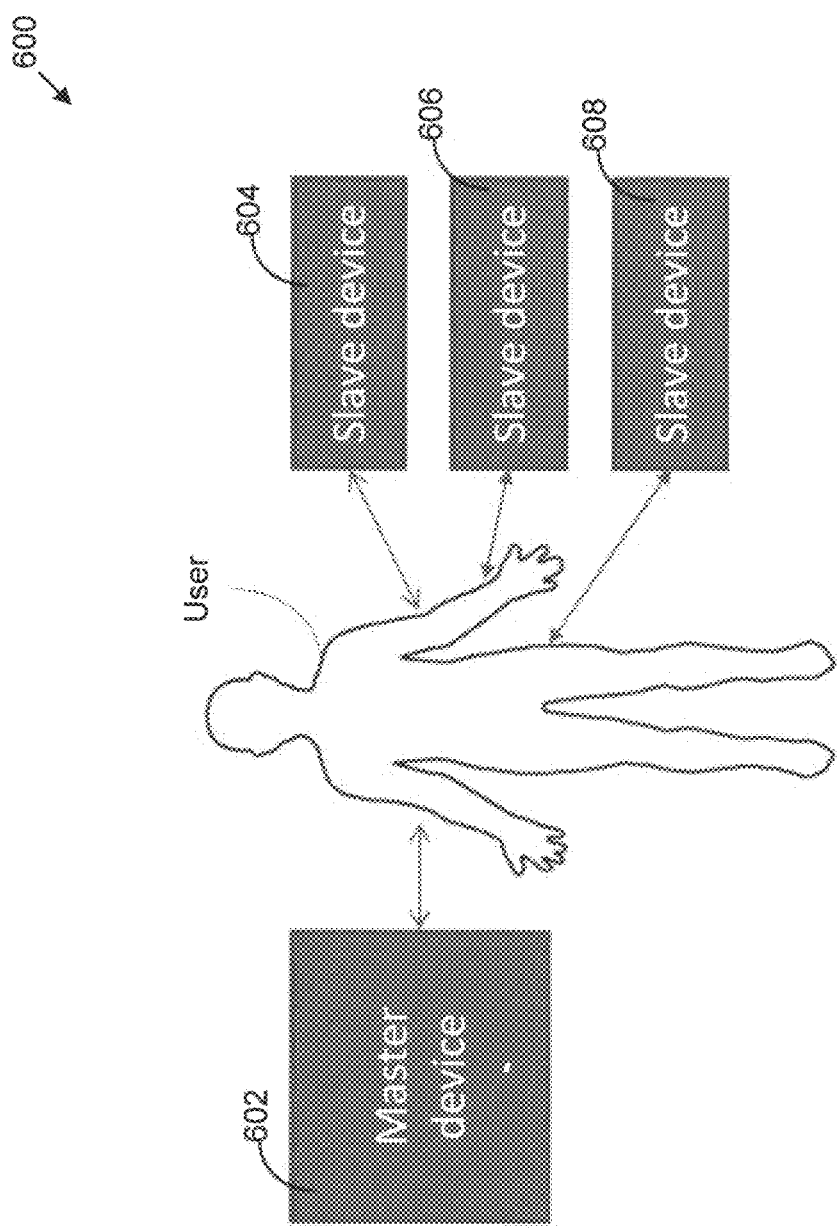
FIG. 6 shows that, in some applications, a master device may initiate ad hoc device-to-device communications with 2 or more slave devices that are attached to or in proximity of a user.

FIG. 6 shows an exemplary data flow process 600 where a master device 602 may initiate ad hoc device-to-device communications with 2 or more slave devices 604, 606 and 608 that are attached to or in proximity of a user. In addition, a slave device may communicate with 2 or more master devices in some applications.

Based on the above, various implementations may be provided. The following examples are provided for ad hoc device-to-device communications between two devices where one of the devices does not have a display function. Devices without a display function can be a sensor device in some applications.

For example, a method can be implemented for providing communications between a capacitor sensor touch screen device that includes a capacitor sensor touch screen with capacitor sensors and a capacitor sensor device that includes one or more capacitor sensors for capacitive sensing without a display function and is attached to or in proximity of a human body of a user. This method can include operating the capacitor sensor device without a display function to detect a device-to-device connection initiation signal from the capacitor sensor touch screen device via capacitive coupling through the human body of the user and, in response, to generate an acknowledgement to the device-to-device connection initiation signal; operating the capacitor sensor device without a display function to detect an acknowledgment back signal generated by the capacitor sensor touch screen device after receiving the acknowledgment from the capacitor sensor device without a display function; and subsequently operating the capacitor sensor device without a display function in a device-to-device communication mode to send data via the one or more capacitor sensors to the capacitor sensor touch screen device without a display function.

For another example, a method can be implemented for providing communications between (1) a capacitor sensor touch screen device that includes a capacitor sensor touch screen that includes capacitor sensors and provides a display function and (2) a capacitor sensor device that includes one or more capacitor sensors that detect or sense, based on capacitive sensing and without providing a display function, signals transmitted from the capacitor sensor touch screen of the capacitor sensor touch screen device. This method includes placing the capacitor sensor device without a display function in proximity of, or in contact with, a body part of a user to be in capacitive coupling with the body part; operating the capacitor sensor touch screen device to (1) control the capacitor sensor touch screen to provide touch-based user interfacing between the user and the capacitor sensor touch screen device, and (2) operate the same capacitor sensor touch screen to sense a device-to-device communication signal from the capacitor sensor device without a display function to allow device-to-device signaling between the capacitor sensor touch screen device and the capacitor sensor device without a display function via capacitive coupling through the human body of the user; operating the capacitor sensor touch screen device to initiate a device-to-device connection initiation signal and to multiplex the device-to-device connection initiation signal in time with a touch screen signal that provides touch-based user interfacing between touching of the capacitor sensor touch screen by the user and the capacitor sensor touch screen device so as to direct the multiplexed signal to the capacitor sensor touch screen; operating the capacitor sensor touch screen to receive an acknowledgement to the device-to-device connection initiation signal in a device-to-device communication signal from the capacitor sensor device without a display function; when the acknowledgment is detected, operating the capacitor sensor touch screen device to send the capacitor sensor device without a display function an acknowledgment back signal that is multiplexed in time with a touch screen signal to the capacitor sensor touch screen; and subsequently operating the capacitor sensor touch screen device to use one or more time slots in a touch screen signal that are not used for touch-based user interfacing between touching of the capacitor sensor touch screen by the user and the capacitor sensor touch screen device to communicate with the capacitor sensor device without a display function.

For yet another example, a method can be implemented for providing communications between a capacitor sensor touch screen device that includes a capacitor sensor touch screen with capacitor sensors and a capacitor sensor device that includes one or more capacitor sensors for capacitive sensing without a display function. This method includes placing the capacitor sensor device without a display function in proximity of, or in contact with, a body part of a user to be in capacitive coupling with the body part; operating the capacitor sensor touch screen device to (1) control the capacitor sensor touch screen to provide touch-based user interfacing between the user and the capacitor sensor touch screen device, and (2) operate the same capacitor sensor touch screen to initiate a device-to-device connection initiation signal and to multiplex the device-to-device connection initiation signal in time with a touch screen signal that provides touch-based user interfacing between touching of the capacitor sensor touch screen by the user and the capacitor sensor touch screen device so as to direct the multiplexed signal to the capacitor sensor touch screen; operating the capacitor sensor device without a display function to detect the device-to-device connection initiation signal via capacitive coupling through the human body of the user and, in response, to generate an acknowledgement to the device-to-device connection initiation signal. This method operates the capacitor sensor touch screen of the capacitor sensor touch screen device to receive the acknowledgement from the capacitor sensor device without a display function. In addition, this method includes, when the acknowledgment is detected, operating the capacitor sensor touch screen device to send the capacitor sensor device without a display function an acknowledgment back signal that is multiplexed in time with a touch screen signal to the capacitor sensor touch screen; operating the capacitor sensor device without a display function to detect the acknowledgment back signal from the capacitor sensor touch screen device and, in response, to set the capacitor sensor device into a device-to-device communication mode to send data to the capacitor sensor touch screen device; and subsequently operating the capacitor sensor touch screen device to use one or more time slots in a touch screen signal that are not used for touch-based user interfacing between touching of the capacitor sensor touch screen by the user and the capacitor sensor touch screen device to communicate with the capacitor sensor device, including receiving the data from the capacitor sensor device without a display function.

Figure 7:
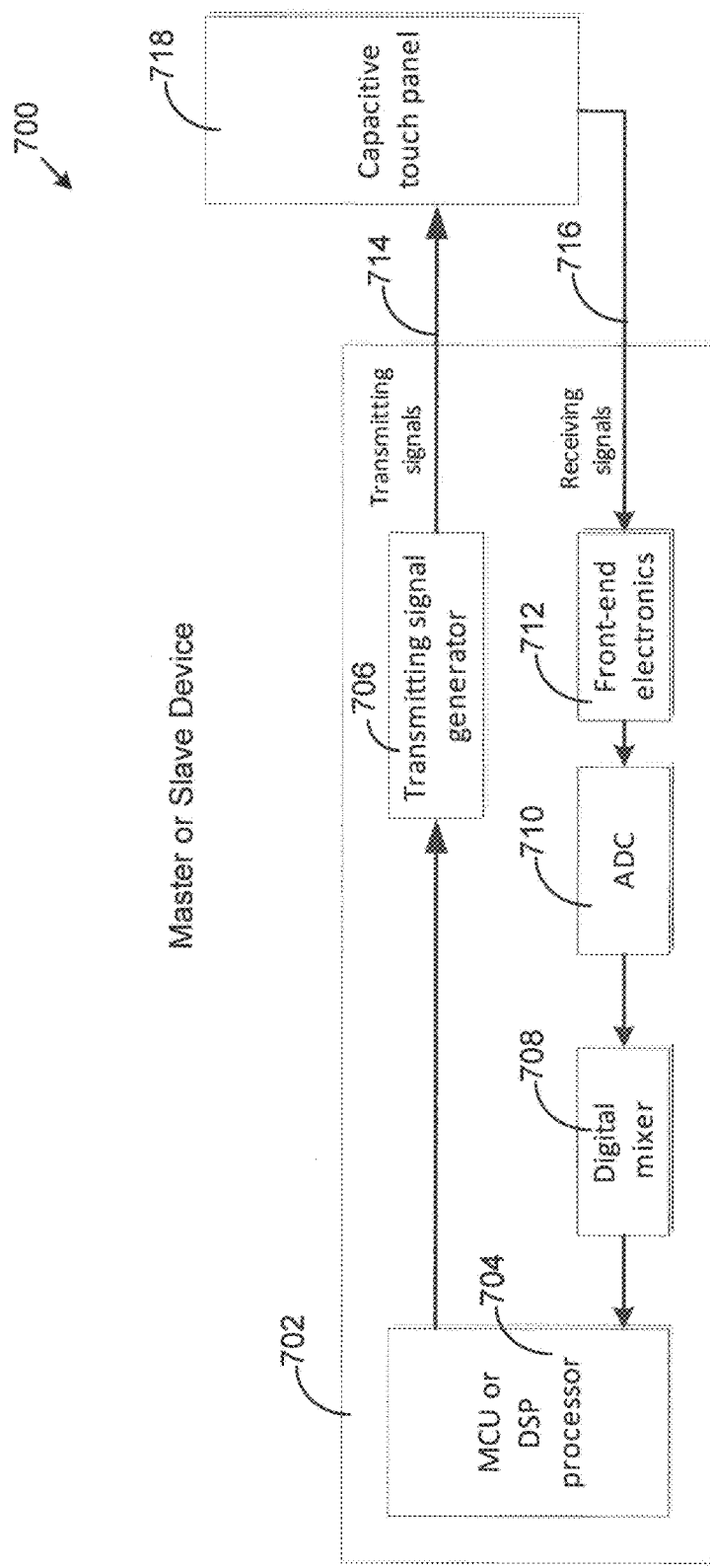
FIG. 7 shows an example of the circuitry layout of a master or slave device having a capacitive touch panel with capacitive sensors.

FIG. 7 shows an exemplary circuitry layout 700 of a master or slave device 702 having a capacitive touch panel with capacitive sensors. Common to both RX and TX circuits in the master or slave device 702 is a microcontroller (MCU) or a digital signal processing (DSP) circuit block 704 that both generate the output signals to a transmission signal generator circuitry 706 coupled to the capacitive touch panel 718 and processes received signals 716 from the receiving circuitry coupled to the capacitive touch panel 718. The receiving circuitry in this example includes a front-end electronics 712 that is coupled to the capacitive touch panel, an ADC module 710 and a digital mixer 708.

Figure 8:
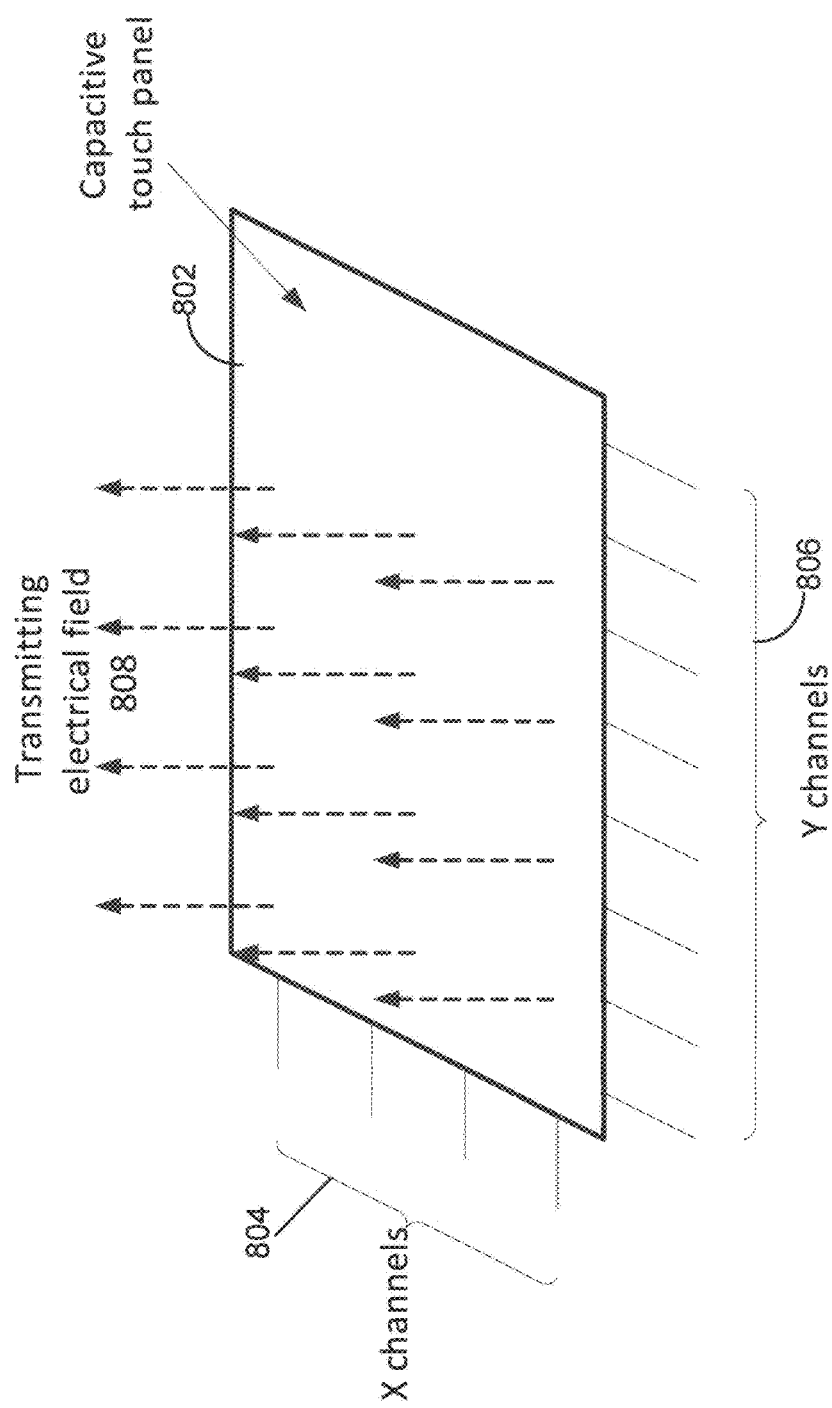
FIG. 8 shows an example of a capacitive touch panel with an array of capacitive pixels along x and y directions.

FIG. 8 shows an example of a capacitive touch panel 802 with an array of capacitive pixels along x 804 and y 806 directions. As illustrated, this capacitive touch panel can transmit or receive signals 808 through capacitive coupling via human body or direct device-to-device contact/coupling. When the capacitive touch panel is used for providing a display function of displaying information to a user, a touch panel user I/O interface for the user to operate and interact with the device, and a device-to-device communication interface for receiving and transmitting a device-to-device communication signal with another device, the signaling for these different functions can be achieved by assigning respective time slots in time division multiplexing.

Figure 9:
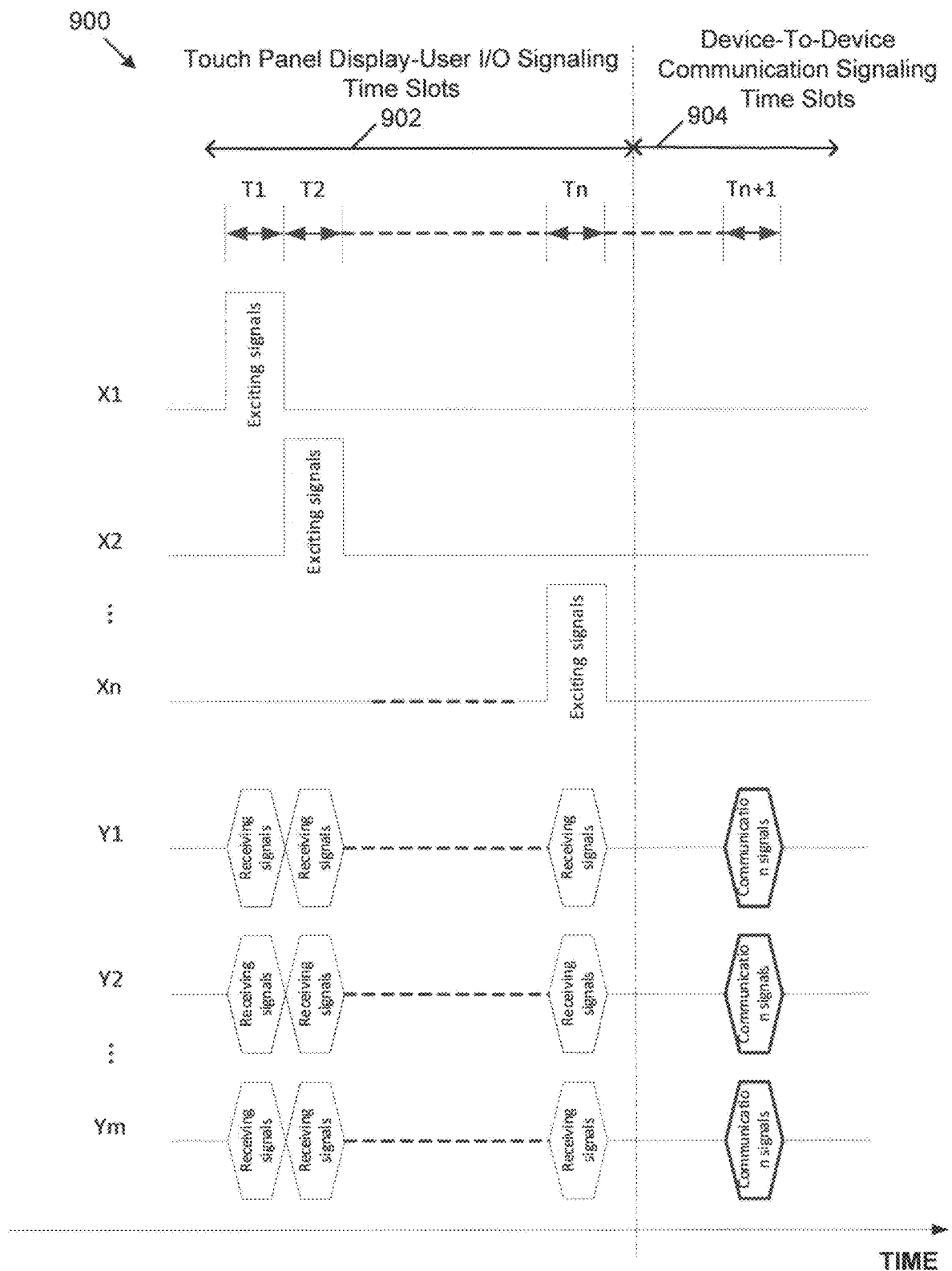
FIG. 9 shows an example of signaling for different touch panel functions based on assigning different messaging in different time slots in time division multiplexing for the capacitive touch panel in FIG. 8.

FIG. 9 shows an example of signaling 900 for different touch panel functions based on assigning different messaging in different time slots in time division multiplexing for the capacitive touch panel in FIG. 8. The signaling is assigned with time slots for touch panel display 902 and user I/O signaling 904 (e.g., the first part of the signaling in time) and time slots for the device-to-device communication signaling (e.g., the second part of the signaling in time). Referring to the example in FIGS. 4 and 5, the signaling between the master device and the slave device is included in the later time slots for the device-to-device communication signaling in FIG. 9.

Figure 10:
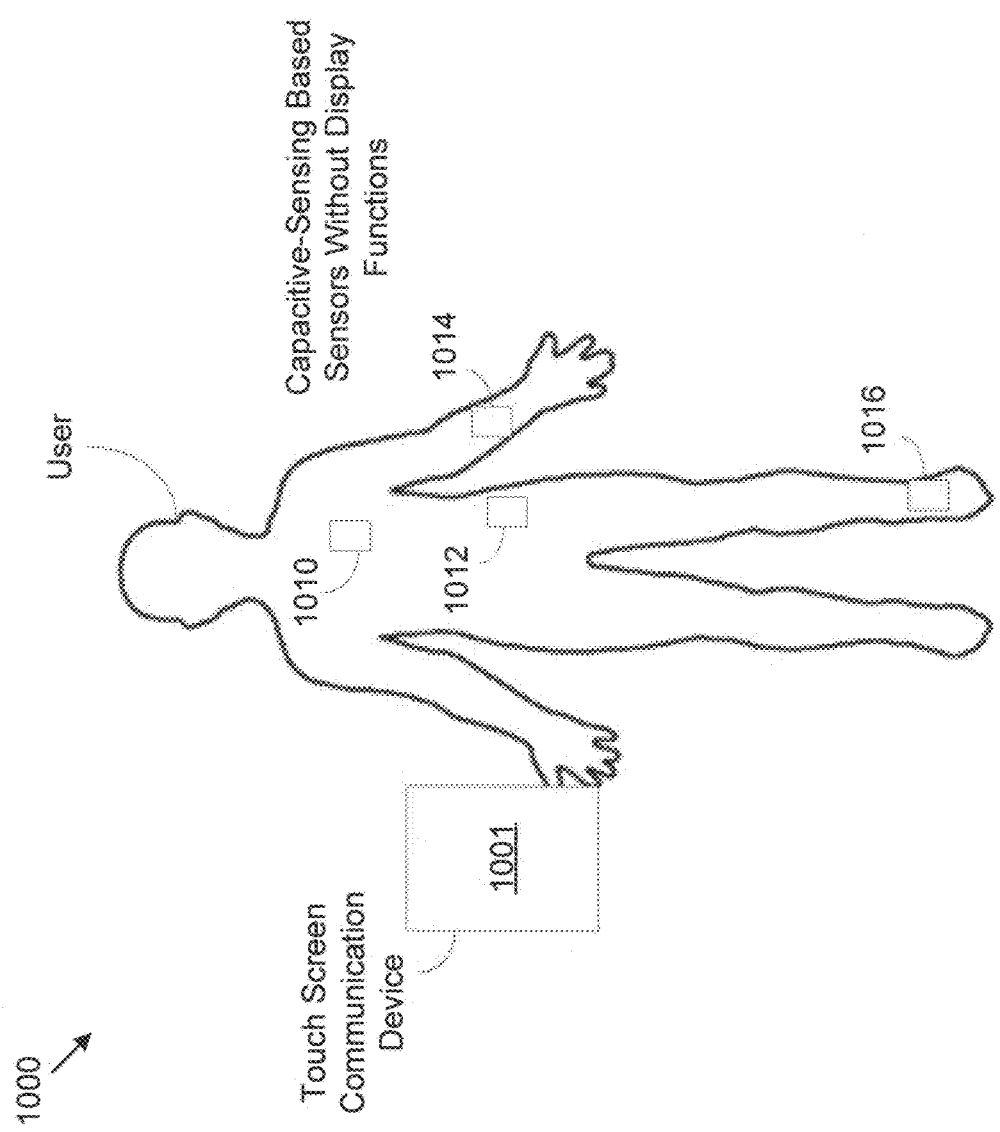
FIG. 10 shows an example of the application as shown in FIG. 6 where one touch screen communication device 1001 is linked to two or more capacitive-sensing based sensors 1010, 1012, 1014 and 1016 without display functions.

FIG. 10 shows an example 1000 of the application as shown in FIG. 6 where one touch screen communication device 1001 is linked to two or more capacitive-sensing based sensors 1010, 1012, 1014 and 1016 without display functions. The touch screen communication device 1001 can be a smart phone, a tablet or a portable computer where the touch panel screen serves the functions of displaying information to a user, a user I/O interface and a device-to-device capacitive-coupling based communication interface. The two or more capacitive-sensing based sensors 1010, 1012, 1014 and 1016 have capacitive sensors without display functions. For example, a capacitive-sensing based sensor 1010, 1012, 1014 or 1016 may also include a capacitive touch panel as the device-to-device capacitive-coupling based communication interface for the sensor but does not provide displaying function. The capacitive-sensing based sensors 1010, 1012, 1014 and 1016 can be attached to the user or be placed in proximity of the user to enable capacitive coupling between each sensor and the user's body for device-to-device communications with the device 1001.

A capacitive-sensing based sensor 1010, 1012, 1014 or 1016 in FIG. 10 may be located at a number of locations depending on the sensing needs. For example, a capacitive-sensing based sensor may be placed on a foot or in a shoe of the user such as the sensor 1016 for sensing a desired parameter (e.g., the movement of the foot). For another example, a capacitive-sensing based sensor may be placed near the waist of the user such as the sensor 1012 for sensing a desired parameter (e.g., attaching to the belt of the user). For another example, a capacitive-sensing based sensor may be placed on the forearm or wrist of the user such as the sensor 1014 for sensing a desired parameter (e.g., the blood pressure or movement of the hand or arm). For yet another example, a capacitive-sensing based sensor may be placed in the chest area of the user such as the sensor 1010 for sensing a desired parameter (e.g., the heart beat, the body temperature or the position or movement of the chest). Measurements from these sensors are communicated to the touch screen communication device 1001. The device 1001 can do local processing the received measurements from the sensors or may be linked to a server in the network cloud to direct the collected measurements to the server for further processing or storage.

Figure 11:
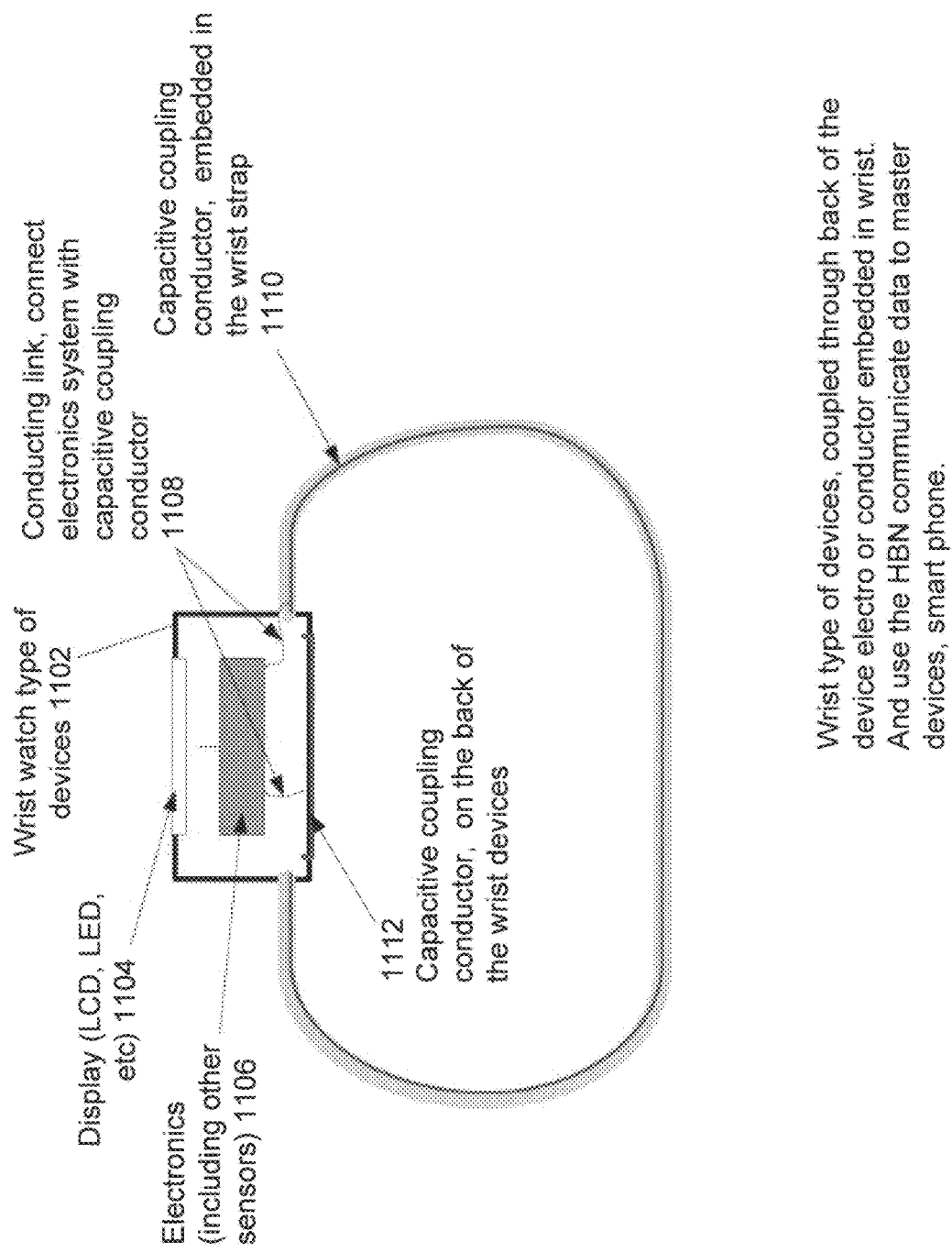
FIG. 11 shows an example a sensor device configured to be worn on a wrist of a user.

FIG. 11 shows an example of a sensor device 1102 configured to be worn on a wrist of a user. In this example, the sensor device includes electronics 1106, a backend capacitive coupling conductor 1112 for the device-to-device communications and a frontend display panel 1104 for displaying information to a user. The wrist strap is embedded with a capacitive coupling conductor 1110 that is electrically connected 1108 to the electronics which is electrically connected to the backend capacitive coupling conductor 1112 which is in contact with the wrist when the device is worn by the user. The electronics 1106 includes a sensor or a communication module to enable device-to-device communications via the backend capacitive coupling conductor 1112 based on capacitive coupling. This sensor device is an example of sensor devices having a backend capacitive coupling conductor which may include a single capacitor conductor or multiple capacitor conductors such as a touch panel for facing or contacting the wrist of the user to provide the capacitive coupling for the device-to-device communications. This sensor device may include a display panel 1104 on the front side for the user to view certain information but the display panel is a separate device from the backend single capacitor conductor or multiple capacitor conductors of a touch panel for the device-to-device capacitive coupling communications. The display panel on the front side can be implemented based on various display technologies, including but not limited to, CCD and LED displays.

Figure 12:
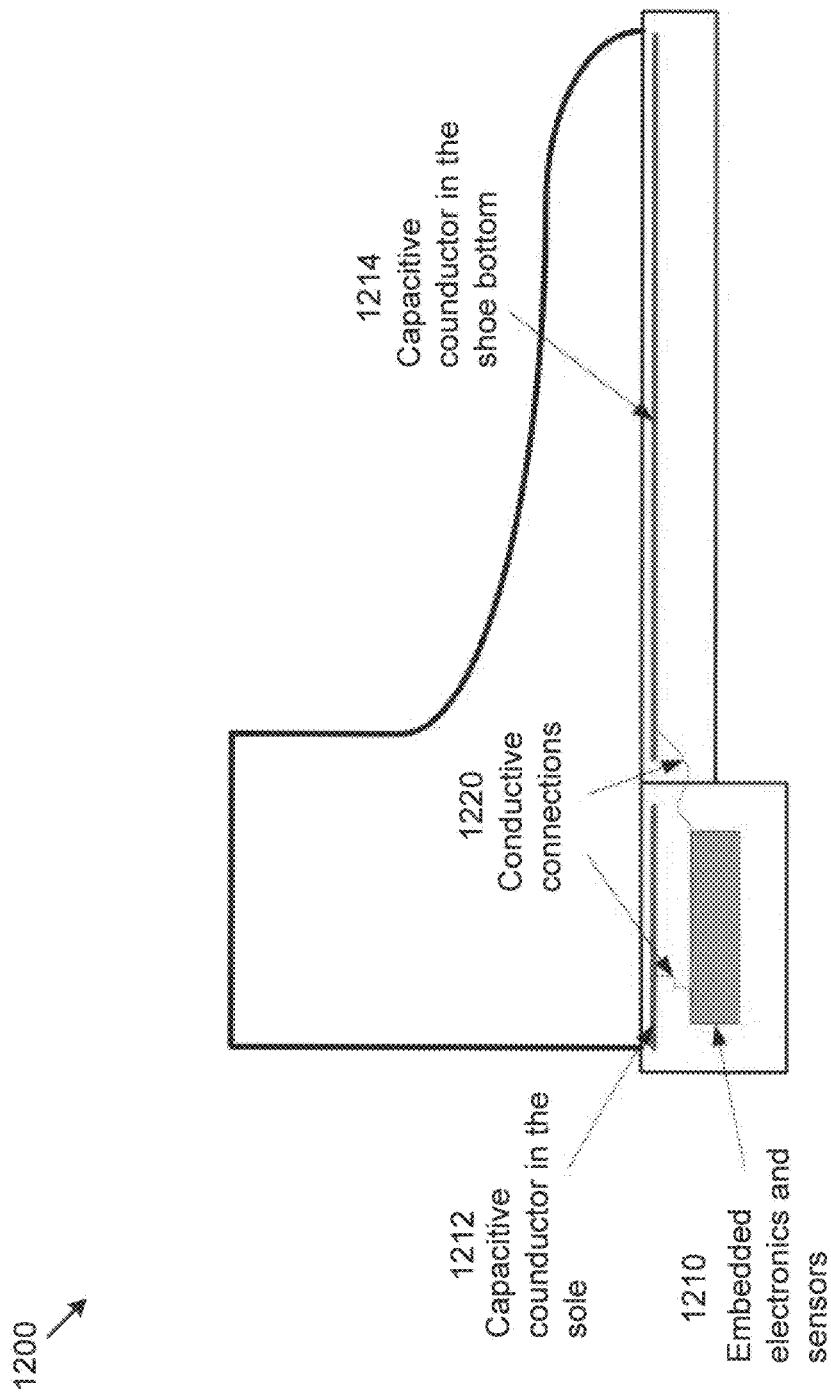
FIG. 12 shows an example a sensor device configured to be embedded in the sole of a shoe of a user.

FIG. 12 shows an example of a sensor device 1200 configured to be embedded in the sole of a shoe of a user. In this example, a sensor device includes an electronic module 1210 that includes electronic circuitry and one or more sensors, and a capacitive conductor 1212 or 1214 that provides the capacitive coupling with the foot of the user for the device-to-device communications. A conductor connection 1220 is provided to connect the capacitive conductor 1212 or 1214 with the electronic module 1210. The capacitive conductors 1212 and 1214 represent two options for the capacitive coupling design. This sensor device is an example of sensors that do not normally have a display panel such as LCD, LED or other display devices for displaying information to the user.

Figure 13:
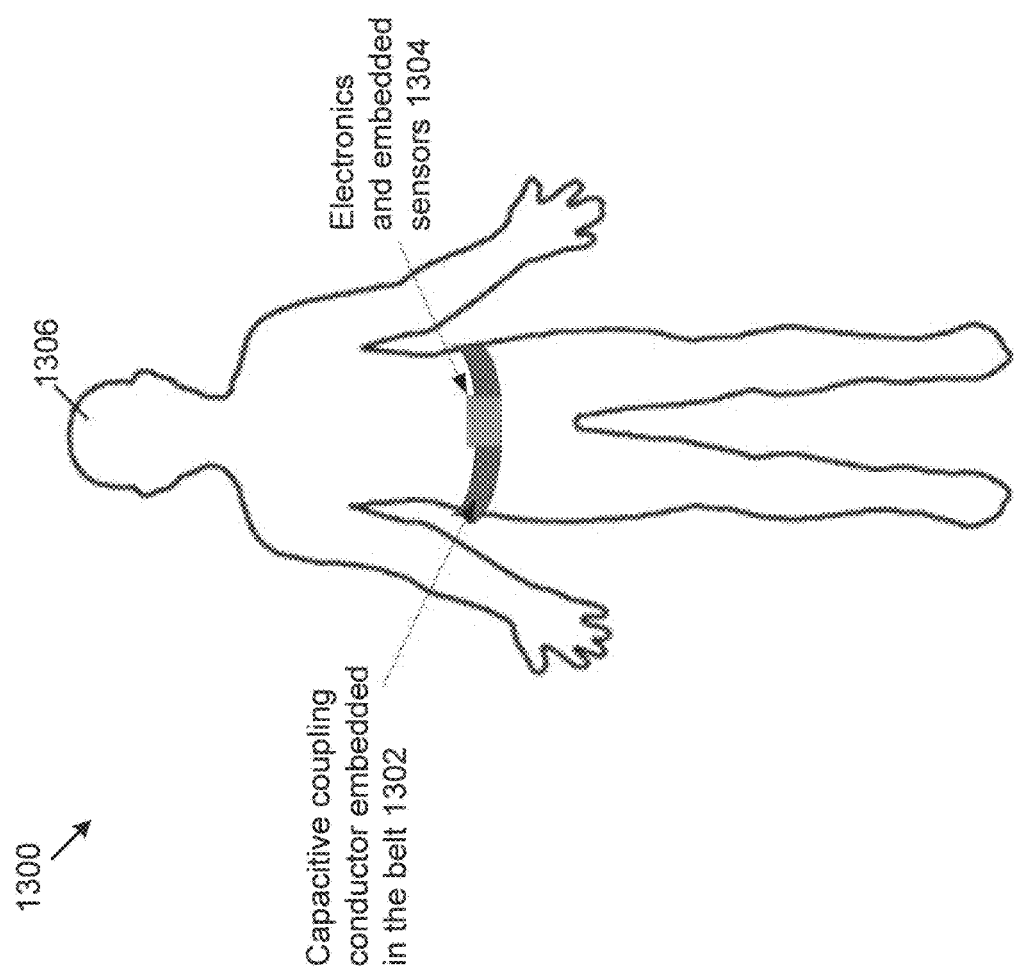
FIG. 13 further shows an example of a capacitive sensor device designed to be worn on a belt of a user.

FIG. 13 further shows an example of a capacitive sensor device 1300 designed to be worn on a belt of a user. Similar to the design in FIG. 11, the belt has an embedded conductor 1302 for the capacitive coupling circuit and the device has a backend capacitive coupling conductor that faces the user body 1306 to enable device-to-device capacitive coupling communications via the user body. The example of the capacitive sensor device 1300 includes electronics and embedded sensors 1304 for detecting capacitive coupled communications. Also similar to the design in FIG. 11, this sensor device may include a display panel on the front side for the user to view certain information but the display panel is a separate device from the backend single capacitor conductor or multiple capacitor conductors of a touch panel for the device-to-device capacitive coupling communications.

Figure 14A:
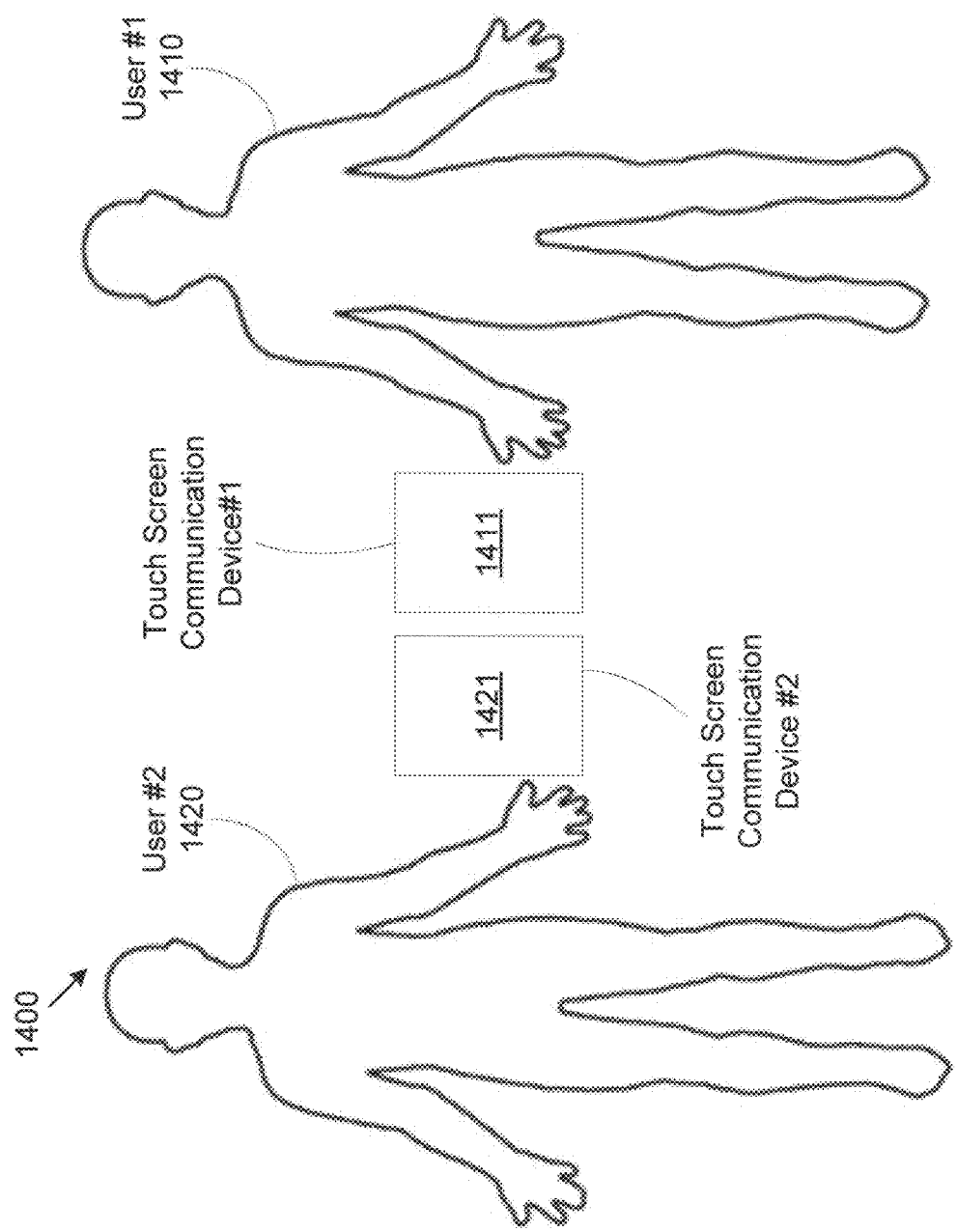
FIG. 14A shows an example of a direct capacitive coupling between two smart phones or tablets that are held to be either close to each other or in direct contact with each other to enable the capacitive coupling between their respective touch panels for device-to-device communications.
Figure 14B:
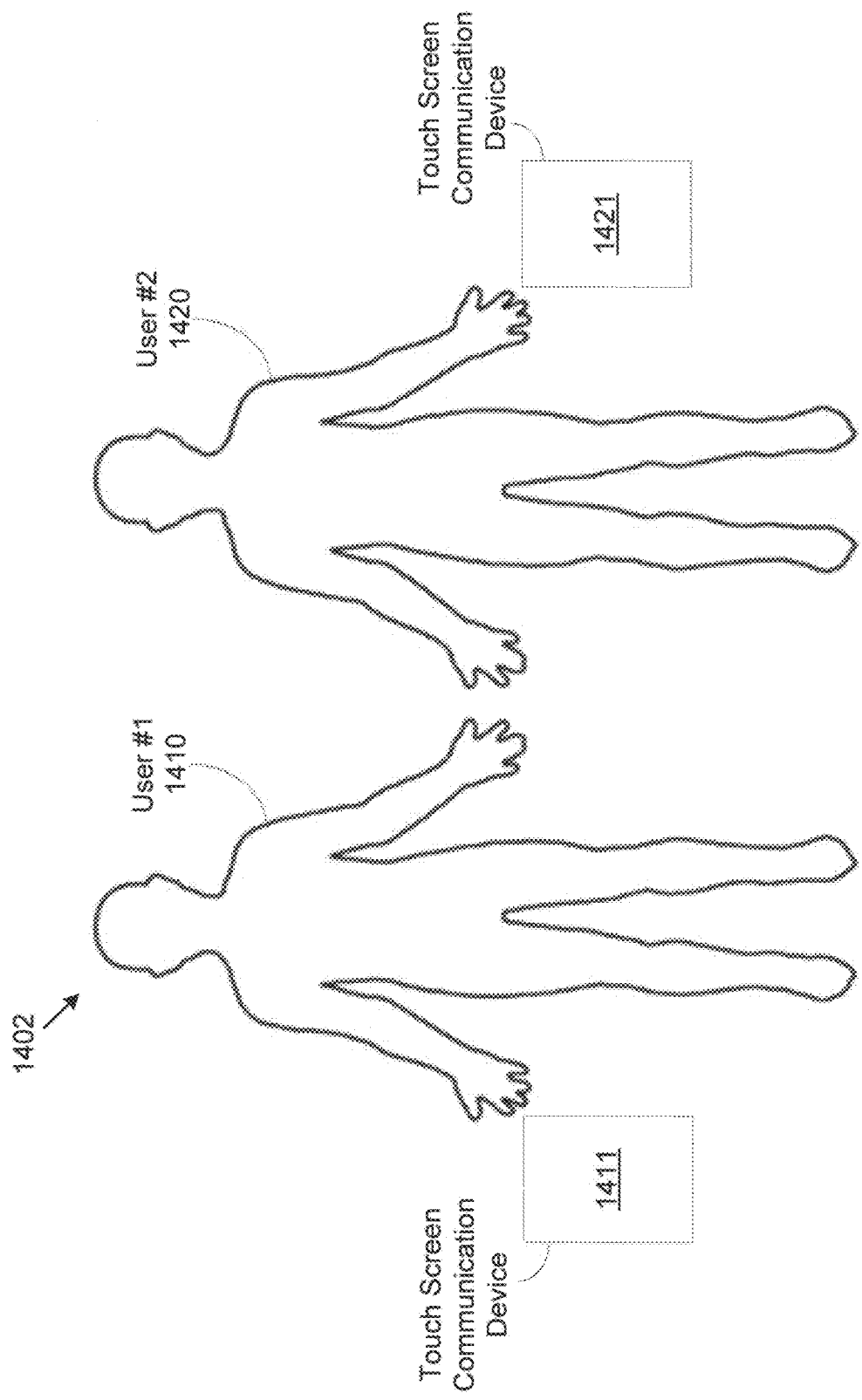
FIG. 14B shows an example of an indirect capacitive coupling between two smart phones or tablets that are held by two persons, respectively.

The above disclosed device-to-device capacitive coupling communications may be implemented to enable two smart phones or tablets with touch panels to communicate with each other based on device-to-device capacitive coupling communications via their touch panels. This device-to-device capacitive coupling communications can provide an alternative or additional communication means to some existing device-to-device communication channels (e.g., RF device to device communications under the Bluetooth and IR device to device communications). In some implementations, the ad hoc communication protocol in FIGS. 3, 4 and 5 and the time division multiplexing (TDM) signaling shown in FIG. 9 can be used to enable such communications. FIGS. 14A and 14B illustrate two exemplary modes of operation for this smart phone to smart phone communications.

FIG. 14A shows an example 1400 of a direct capacitive coupling between two smart phones or tablets 1411 and 1421 that are held to be either close to each other or in direct contact with each other to enable the capacitive coupling between their respective touch panels for device-to-device communications. The two smart phones or tablets 1411 and 1421 can held by one person or two persons 1410 and 1420 as shown in FIG. 14A to be sufficiently close or in contact to enable the capacitive coupling between their respective touch panels. Upon completion of the ad hoc communication protocol in FIGS. 3, 4 and 5, the two smart phones or tablets 1411 and 1421 can exchange data.

FIG. 14B shows an example 1402 of an indirect capacitive coupling between two smart phones or tablets 1411 and 1421 that are held by two persons 1410 and 1420, respectively. The two persons 1410 and 1420 contact each other to provide the capacitive coupling via the two user bodies between the two smart phones or tablets 1411 and 1421. Upon completion of the ad hoc communication protocol in FIGS. 3, 4 and 5, the two smart phones or tablets 1411 and 1421 can exchange data.

Examples of implementations of the disclosed technology can include device-to device communications for providing secured transactions and other applications. Secured transactions usually require a security or identification check and verification to ensure an authorized person is accessing a device or system.

One way of achieving security or identification check and verification is using fingerprint as biomarkers. However, electronic devices or systems equipped with fingerprint authentication mechanisms may be hacked by malicious individuals who can obtain the owner's fingerprint, and somehow copy the stolen fingerprint pattern on a carrier object that resembles a human finger, which can then be used to unlock the targeted device. Hence, the fingerprint pattern, although a unique biometric identifier, may not always be a reliable or secure identification. In one aspect, fingerprint detection modules for human fingerprint detection and authentication can be implemented to include an optical sensing unit to determine whether a detected object is human as an additional measurement obtained from a person to combine with the person's fingerprint pattern as a combined authentication method to identify whether the authorized person is accessing the device.

Figure 15:
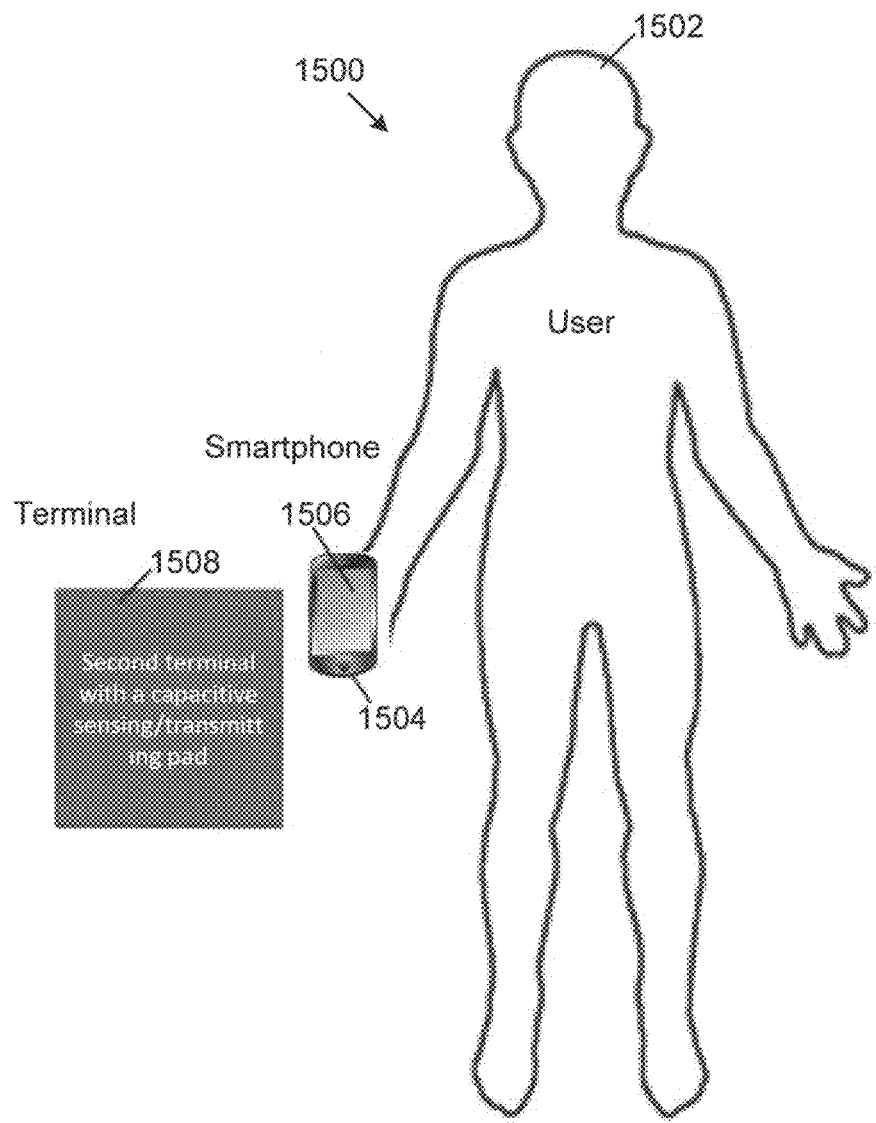
FIG. 15 shows one example of a transaction system.

Several examples of implementations for using device-to device communications to provide secured transactions and other applications are described in this patent document. FIG. 15 shows one example 1500 of a transaction system. The transaction system includes a smart phone 1504 with a touch screen 1506 and a fingerprint sensor (not shown), and a second terminal 1508 with a capacitive sensing/transmitting screen or pad. The user uses the smart phone to initiate a transaction by selecting a start button in a app controlling the transaction, the app requests security verification for example by either a password entry or a finger print verification through the smart phone's fingerprint sensor. Once the verification is confirmed, the user moves the smart phone to the close proximate so its touch screen is in close proximate with the capacitive sensor/transmit pad (or another touch screen) to transmit the encrypted transaction information to the second terminal. The second terminal sends back to the smartphone confirmation of the transaction also through capacitive coupling channel between smartphone touch screen and capacitive sensing/transmit pad (or another touch screen). The second terminal with a capacitive sensing/transmitting screen or pad can be a portable device carried by a sales person, a part of a desktop terminal, a desktop computer or a kiosk machine.

In implementations of FIG. 15, a smart phone 1504 has a capacitive touch panel. The low frequency electrical signals from the capacitive touch panel can be coupled to the second terminal with capacitive sensing/transmit elements to complete communication functions. The smartphone also includes a fingerprint sensor can verify user ID. Improved security can be provided in the smartphone by using additional sensors, such as optical sensors. The second terminal can be connect to the Internet or other network in order to complete transaction with a server on the Internet or network.

Figure 16:
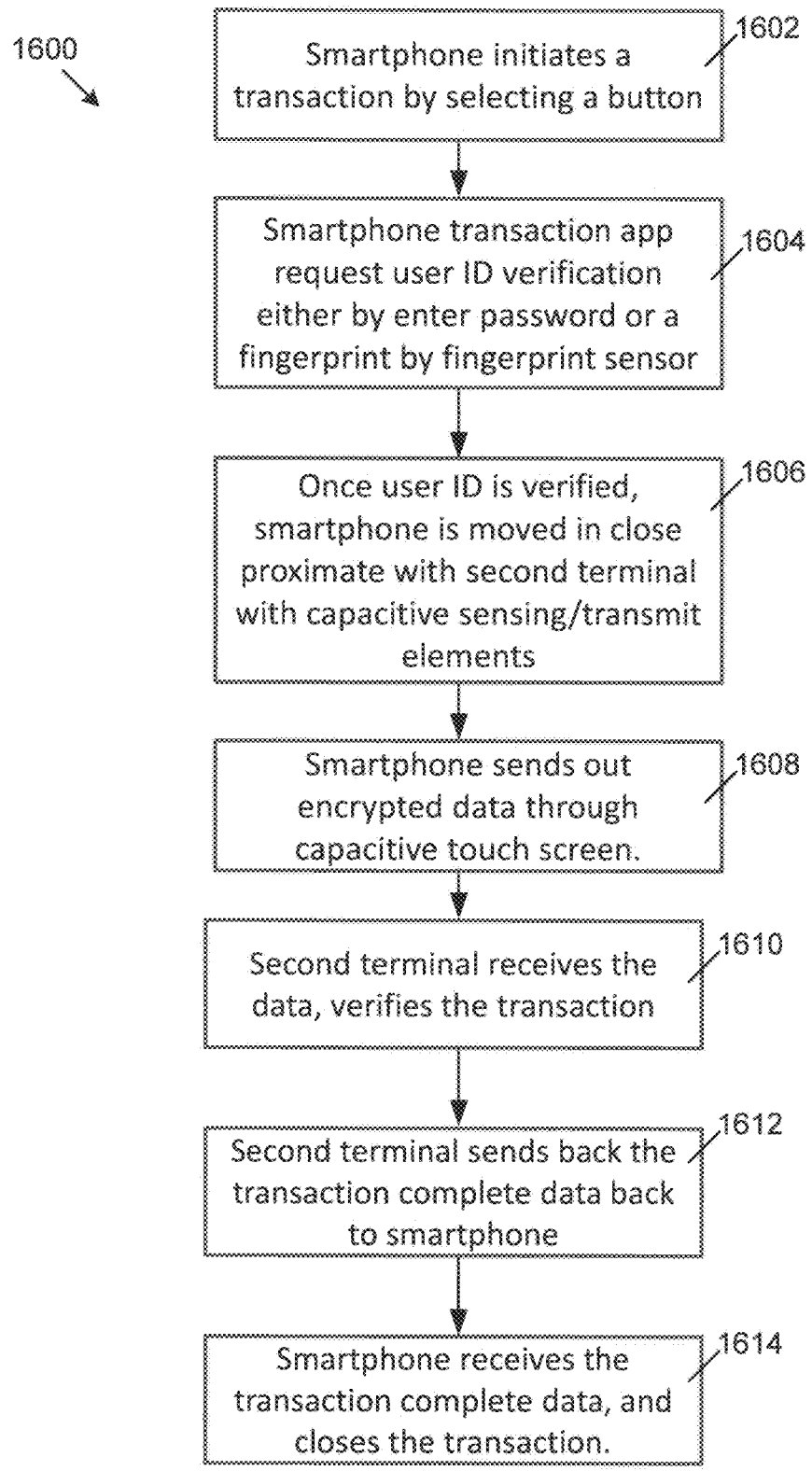
FIG. 16 provides an example of the processing for the secured transaction in FIG. 15.

FIG. 16 provides an exemplary processing 1600 for the secured transaction shown in FIG. 15. The smartphone initiates a transaction (e.g., by selecting a button) (1502). A smartphone transaction application requests user ID verification by entering a password or scanning a fingerprint (1604). Once the user ID has been verified, the smartphone is moved in close proximity with the second terminal with capacitive sensing/transmit elements (1606). The smartphone sends out encrypted data through capacitive touch screen (1608). The second terminal receives the data, and verifies the transaction. (1610). The second terminal sends back the transaction complete data back to the smartphone (1612). The smartphone receives the transaction complete data, and closes the transaction.

Figure 17:
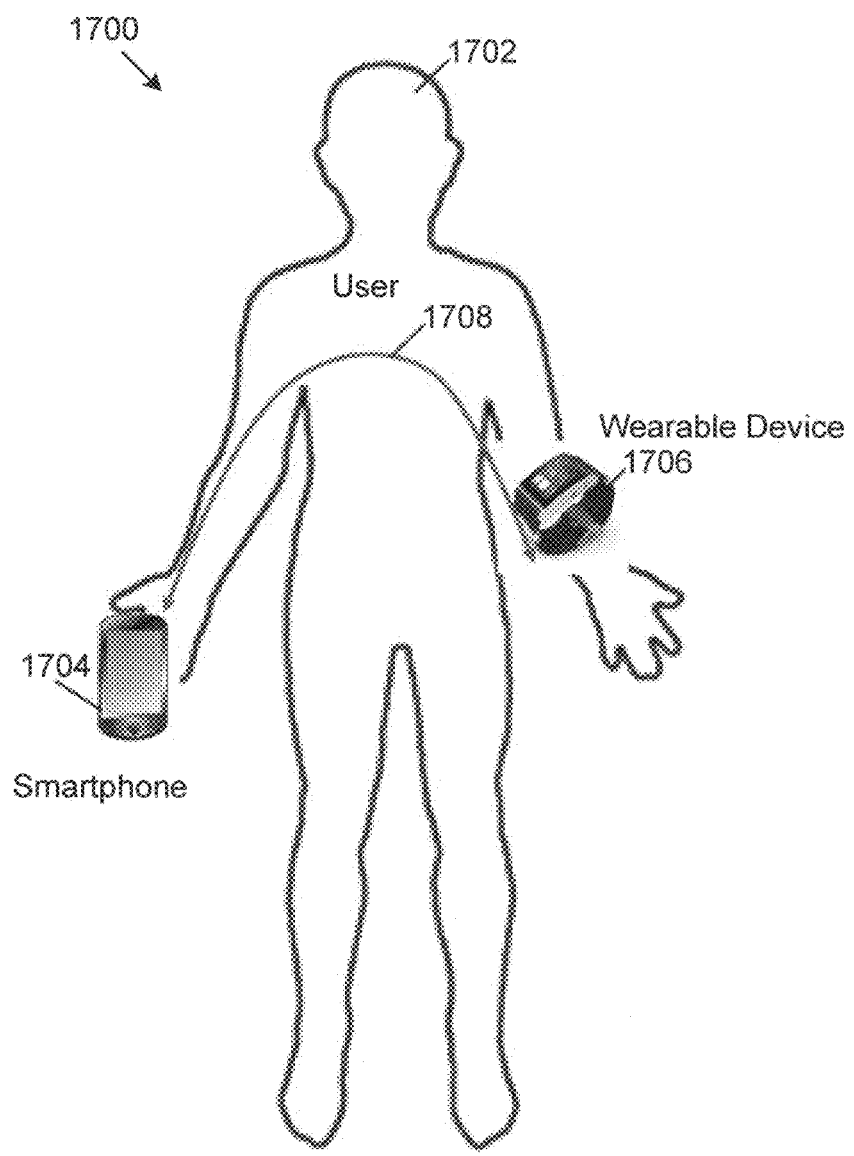
FIG. 17 shows an example of a wearable security device in connection with a user identification via a smartphone or other form of ID verification.

FIG. 17 shows an example 1700 of a wearable security device 1706 in connection with a user identification via a smartphone 1704 or other form of ID verification. The wearable security device 1706 can include a microcontroller unit (MCU), a memory, and electronics to encode data in a low frequency electrical signals coupled to the body of the user. This wearable device 1706 may be configured as a wrist watch, a bracelet, or something worn on the belt. The encrypted ID information data is coupled to person's body 1702, and when the person touches a locked smartphone touch screen surface, or simply just holds the locked smartphone, there is a communication 1708 between the wearable device and the smartphone to exchange ID information of the person. The smartphone receives the information, and verifies the ID information, and turns the smartphone into unlock mode.

Figure 18:
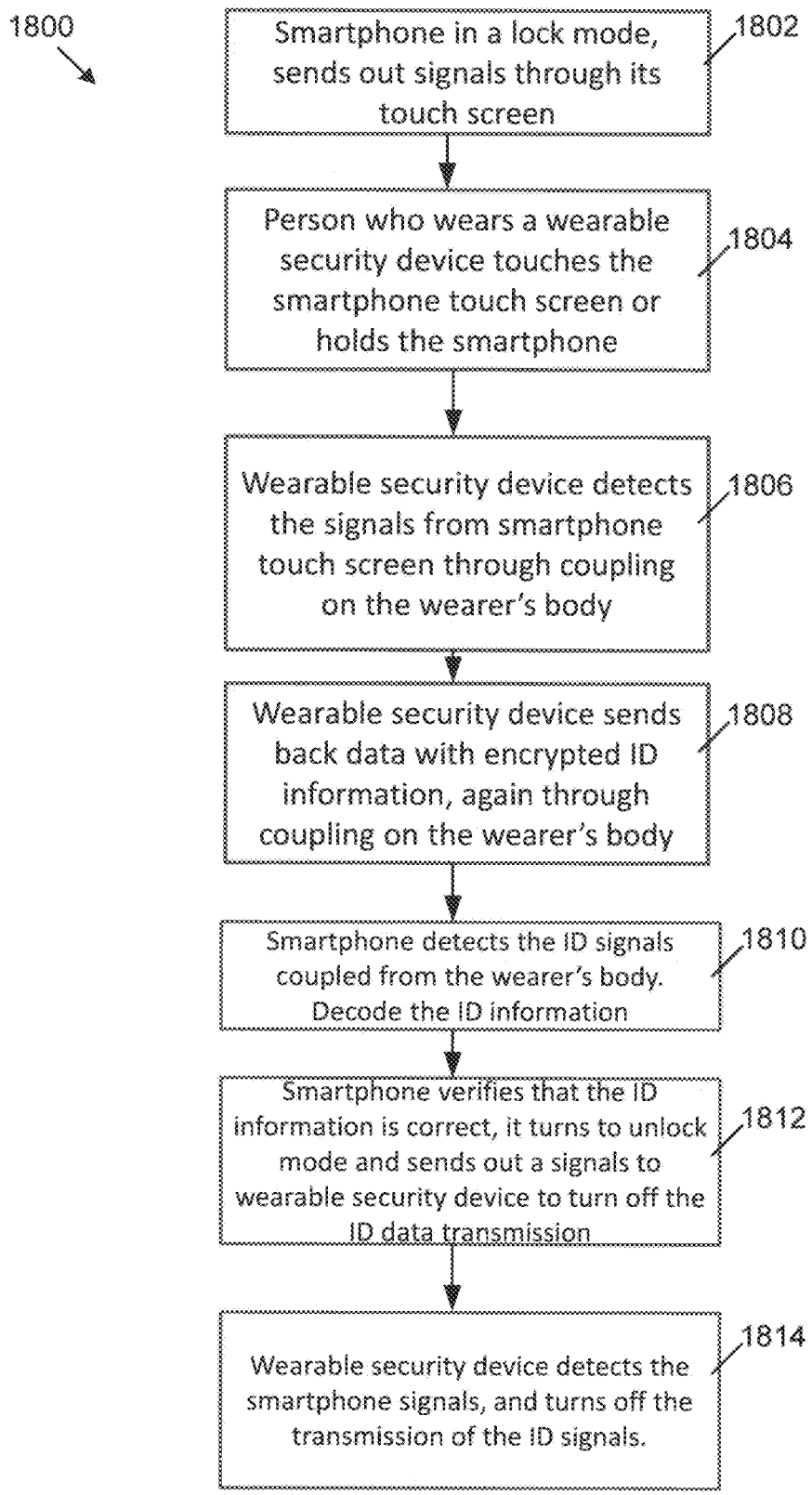
FIG. 18 provides an example of the processing for the secured transaction in FIG. 17.

FIG. 18 provides an exemplary process 1800 for the secured transaction in FIG. 17. A host device, such as a smartphone in a locked mode transmits signals through the touch screen of the host device (1802). A user wearing a wearable device touches the smartphone touch screen or holds the smartphone (1804). The wearable device worn by the user detects the signals transmitted through the smartphone touch screen through capacitive coupling on the user's body (1806). The wearable device replies back to the smartphone with data that includes encrypted ID information through the user's body (1808). The smartphone detects the ID signals transmitted by the wearable device which is coupled with the user's body and decodes the ID information (1810). The smartphone verifies that the ID information is correct and changes to an unlocked mode and sends out signals to the wearable security device to turn off the ID data transmission (1812). The wearable security device detects the signals sent by the smartphone and turns off the transmission of the ID signals (1814).

The process 1800 shown in FIG. 18 can be described from the perspective of the wearable device. The wearable device detects a signal sent from a host device, such as a smartphone through the user's body using a capacitive coupling channel. The received signal includes a request to authenticate the wearable device with the host device. In response, the wearable device replies with authentication data that includes encrypted ID and password information, which is transmitted through the user's body using capacitive coupling. The wearable device receives a signal from the host device confirming a successful authentication of the wearable device (also indicating that the host device is now unlocked and ready to perform operations) and indicating that the wearable device can stop transmitting the authentication data. Responsive to receiving the confirmation signal, the wearable device stops transmitting the authentication data.

Figure 19:
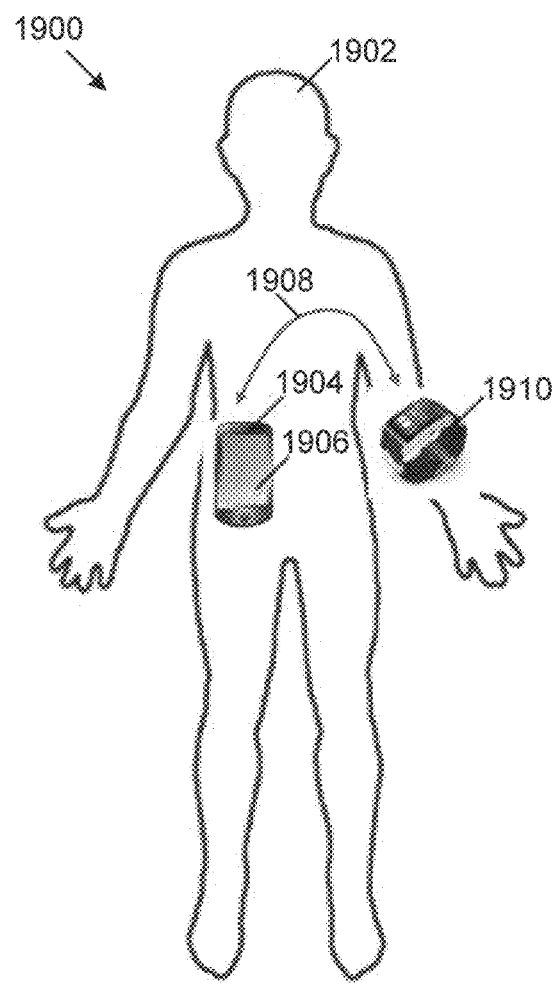
FIG. 19 shows another example of a secured transaction between a smartphone having capacitive touch panel.

FIG. 19 shows another example (1900) of a secured transaction between a smartphone having capacitive touch panel. The low frequency electrical signals 1908 from capacitive touch panel 1906 of the smartphone 1904 can be coupled to the human body 1902 in contact with the smartphone 1904 and a wearable device 1910 attached or in the proximity of the human body 1902 can pick up the signals 1908 and detect the data sent from the smartphone 1904. Conversely, the other device (e.g., a wearable device) 1910 can use the similar method to send the data through capacitive coupling of electrical signals 1908 to human body 1902 to be received by the smartphone's 1904 capacitive touch sensor 1906.

The above technology can be used to provide wearable security devices to provide secured communications or transactions. Such secured communications or transactions can be implemented by using a smartphone equipped with ID verification such as a fingerprint sensor or other form of ID verification.

Figure 20:
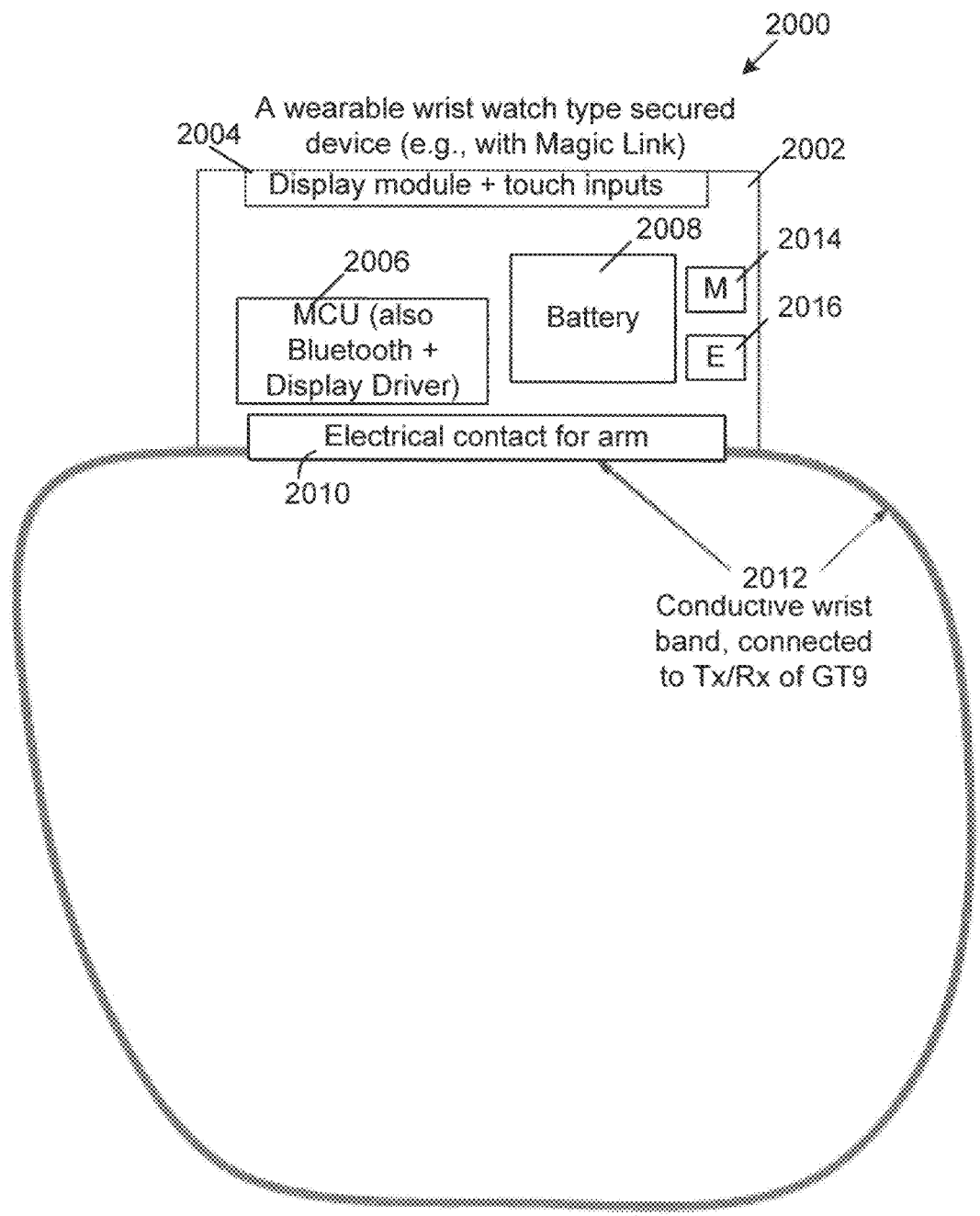
FIG. 20 shows an example of a wearable device in form of a wrist watch.

FIG. 20 shows an example (2000) of a wearable device 2002 in form of a wrist watch. This watch includes a, display module with touch inputs 2004, an electrical contact 2010, MCU 2006, a memory 2014, battery 2008, and electronics 2016 to encode data in a low frequency electrical signals coupled to the body of the wearer. The MCU 2006 can be in communication with rest of the components on the wearable device 2002 control various operations of the wearable device 2002. In some implementations, the MCU 2006 can perform operations of the electronics 2016 instead or in cooperation with the electronics 2016. The encrypted ID information data can be coupled to person's body, when the person touches a locked smartphone touch screen surface, or simple just holds the locked smartphone, there is a communication between the wearable device and the smartphone to exchange ID information of the wearer person, the smartphone receives the information, and verifies the ID information, and turns the smartphone into unlock mode. Also when person touches a Point of Sales (POS) terminal equipped with a capacitive touch screen, or capacitive touch pad supporting the capacitive coupled communications, the ID information and other authentication information of the wearer person can be sent to the POS terminal. And the POS terminal will verify the authentication information with a server on the internet or network, and complete the transaction upon the verification is confirmed.

Figure 21:
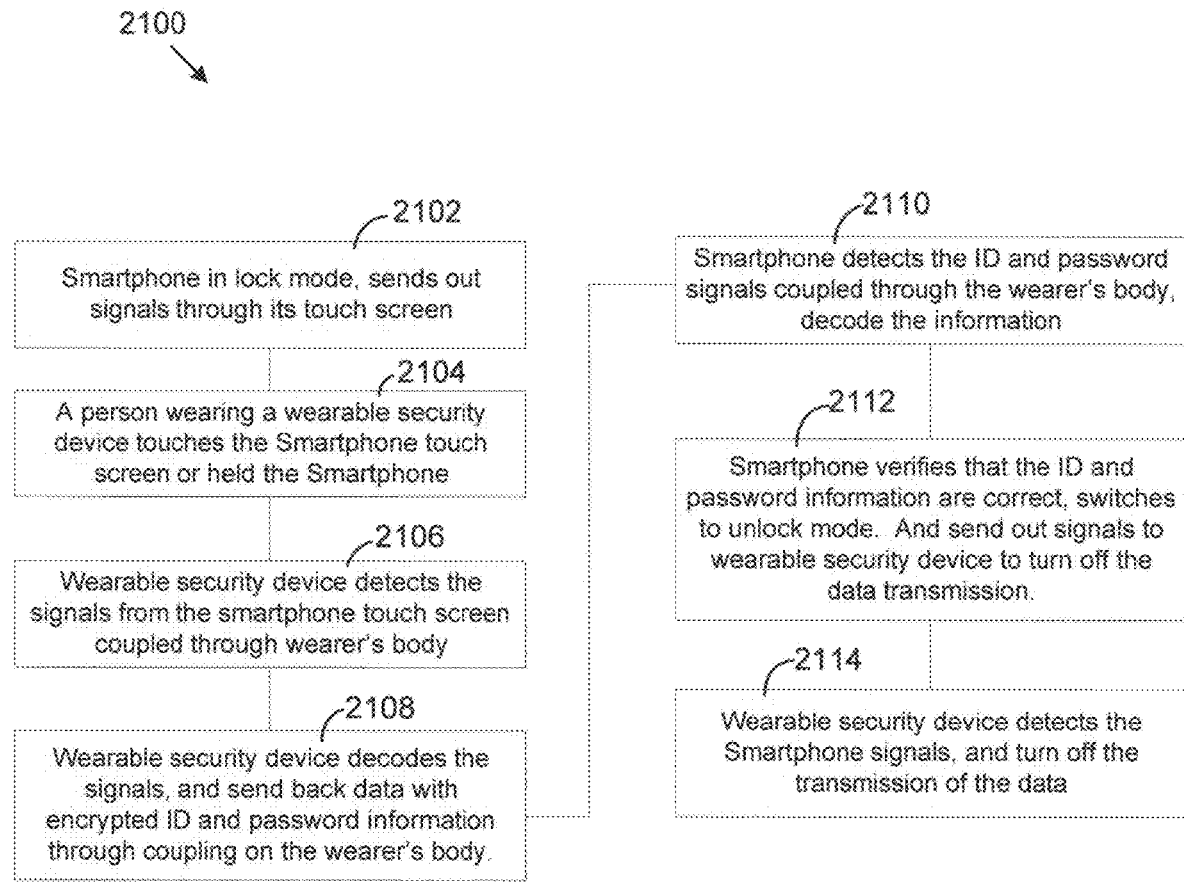
FIG. 21 shows an exemplary process for registering a wearable device with a host device.

Such a wearable security device can be registered to a unlock Smartphone so that a authorization privilege of the wearable security device can be established by communication between wearable device and the smartphone. A person wearing this wearable device can gain access of the Smartphone with the authorization privilege by sending authentication data to smartphone via communication channels of capacitive coupling signals between wearable device communication electro and Smartphone touch screen. An exemplary process 2100 is illustrated in FIG. 21. Further-more, different access privilege can be registered with the smartphone for different wearable devices. So certainly access control can be implemented for different users wear different devices.

As shown in FIG. 21, a smartphone in a locked mode sends out signal(s) through the touch screen on the smartphone (2102). A user wearing a wearable device touches the smartphone's touch screen or holds the smartphone (2104). The wearable security device detects the signals from the smartphone's touch screen received through capacitive coupling through the user's body (2106). The wearable device decodes the received signals or data and replies with encrypted ID and password information through the capacitive coupling channel through the user's body wearing the wearable device (2108). The smartphone detects the received encrypted ID and password information through the capacitive coupling channel through the user's body and decodes or decrypts the ID information (2110). The smartphone verifies that the decoded or decrypted ID and password information are correct, switches to an unlocked mode, and sends out signal(s) to the wearable device through the user's body using capacitive coupling to turn off the data transmission (2112). The wearable device detects the signal(s) received from the smartphone and turns off the transmission of the encrypted ID and password information (2114).

Figure 22:
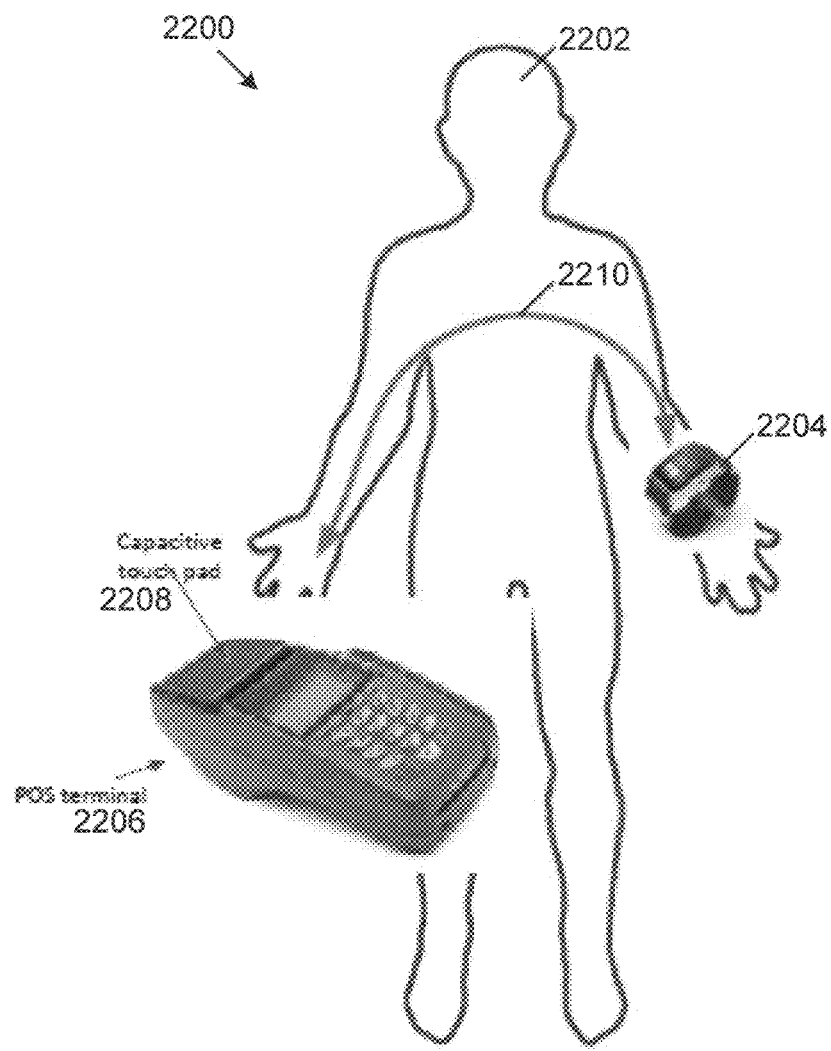
FIG. 22 shows an exemplary implementation of processing transactions between a wearable device and a POS terminal.
Figure 23:
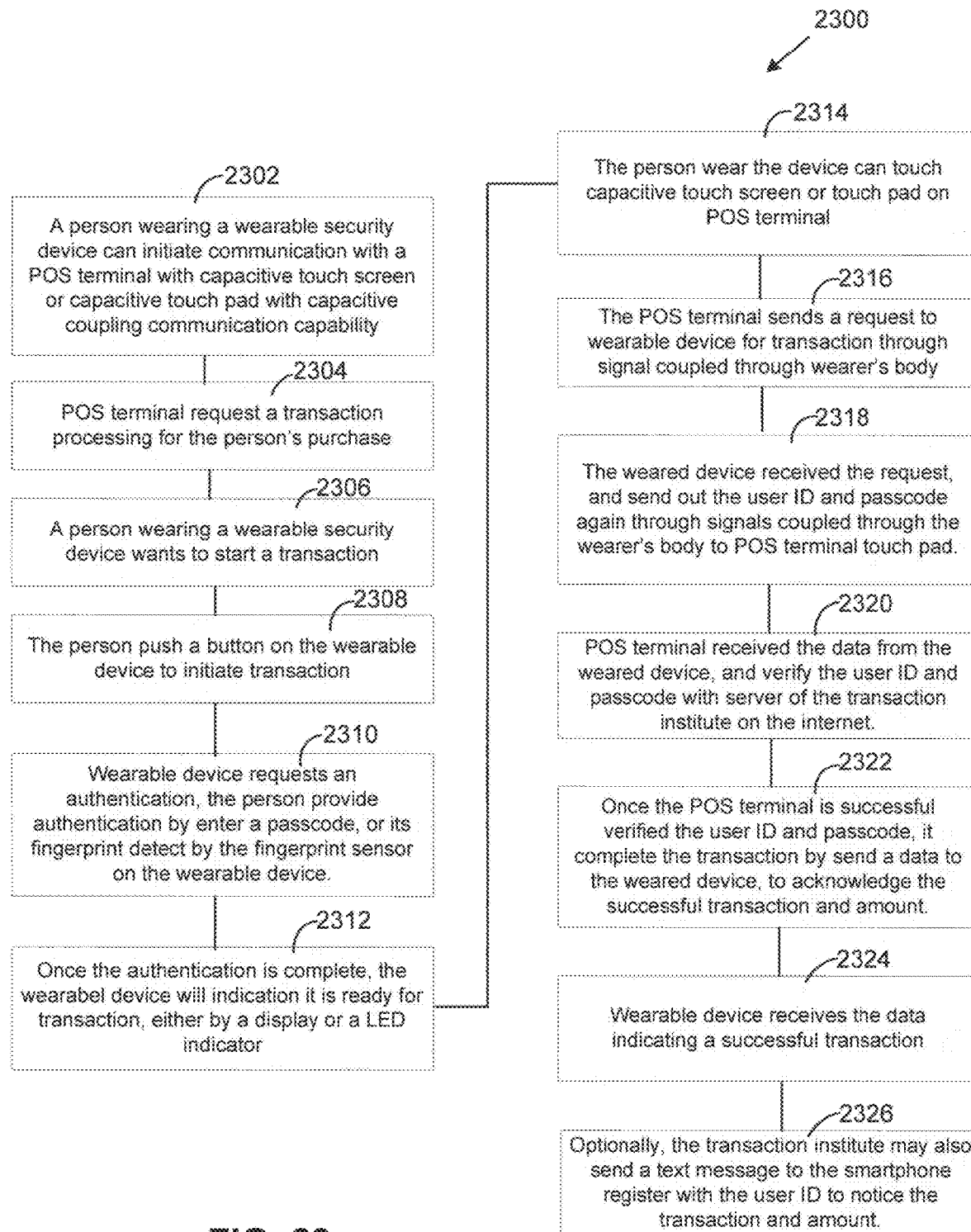
FIG. 23 shows an exemplary process for performing transactions between a wearable device and a POS terminal shown in FIG. 22.

FIG. 22 shows an exemplary implementation 2200 of processing transactions between a wearable device 2204 and a POS terminal 2206. FIG. 23 shows an exemplary process 2300 for performing transactions between a wearable device 2204 and a POS terminal 2206 shown in FIG. 22.

With respect to FIGS. 22 and 23, The wearable device 2204 can communicate with the POS terminal 2206 to process transactions (2302). When a person or user 2202 wearing the wearable device 2204 wants to make a purchase transaction through a POS terminal 2206, the POS terminal can request transaction processing for the person's purchase by providing a transaction amount of the user's purchase, and enter a mode waiting to receive user ID and passcode to authorize the transaction from the person 2202 wearing the device (2304). When the person 2202 wearing the wearable device 2204 wants to start a transaction (2306), the person 2202 wearing the wearable device 2204 can enter the transaction mode by pushing a button on the wearable device 2204, for example (2308). The wearable device 2204 can present an authentication request to ask the wearer 2202 to enter a passcode to authenticate the access to the wearable device 2204, or enter a fingerprint with a fingerprint sensor built in the wearable device 2204 (2310). Once the passcode or the fingerprint is verified with the registered information, the wearable device 2204 can indicate it is ready to perform the transaction (e.g., by displaying a message on the display screen or enabling an indicator such as an LED indicator) (2312). A part of the wearer's body, for example his hand, can touch the POS terminal's 2206 capacitive coupling pad (or touch screen) 2208 (2314). The POS terminal 2206 can send a request for information or data needed to authorized the transaction to the wearable device 2204 through the user's body using a capacitive coupled channel (2316). The wearable device 2204 receives the request and a capacitive coupled electrical signal 2210 carrying the authentication data (e.g., encrypted ID and password information) can be transferred to the POS terminal 2206 through the capacitive coupled communication channel (2318). Once the POS terminal 2206 receives the authentication data, the POS terminal 2206 communicates with a server at the transaction control institute through the Internet, to verify the authentication data (2320). After the authentication completes, the POS terminal 2206 will send data to the wearable device 2204, to indicate completion of the transaction (2322). Once the wearable device receives this signal, it completes the transaction (2324).

In some implementations, upon completion of the transaction, the server at the transaction control institute can optionally send a text message to the smartphone, where this wearable device is registered (2326).

Figure 24:
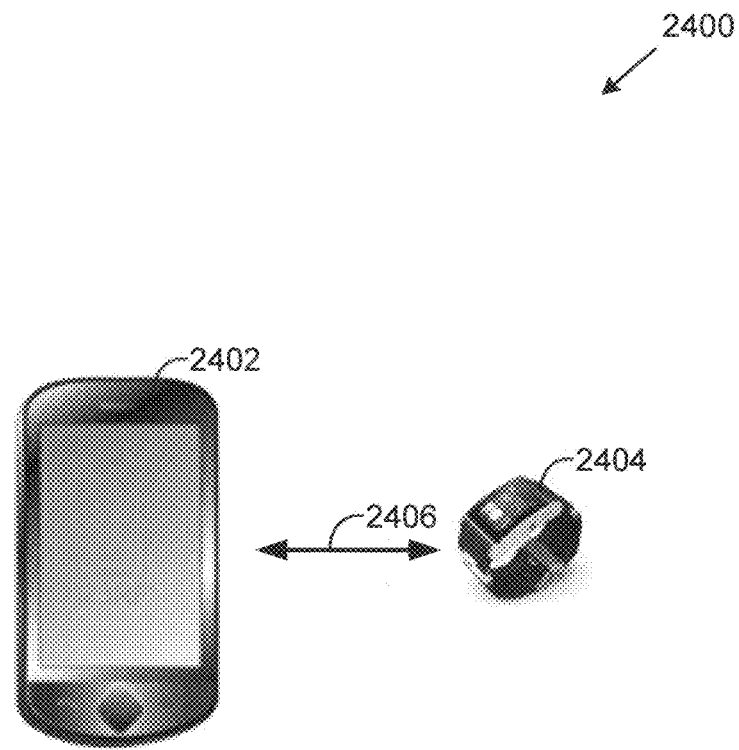
FIG. 24 shows a wearable device communicating with a registered or associated smartphone.

In some implementations 2400, as shown in FIG. 24, a wearable device 2404 can communicate 2406 with a registered or associated smartphone 2402, where the transaction application on the smartphone 2402 can allocate an amount of money to the wearable device, thus to authorize the wearable device to spend up to a certain amount of the money.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Only a few embodiments are described. Other embodiments and their variations and enhancements can be made based on what is described and illustrated.

What is claimed is what is described and illustrated, including:

1. A wearable device for capacitive coupled communications, the wearable device comprising:
   capacitive sensor transceiver circuitry configured to receive a capacitive coupled signal from a host device, wherein the capacitive coupled signal is received through a body of a user of the wearable device and is modulated to include a request for authentication data including encrypted identification information identifying the wearable device to authenticate the wearable device with the host device, and wherein the capacitive coupled signal is an electrical signal; and
   processing circuitry in communication with the capacitive sensor transceiver circuitry to process the received capacitive coupled signal, and transmit, by the wearable device, authentication data, stored in a memory of the wearable device, comprising encrypted identification information and password information modulated on a capacitive coupled reply signal to the host device, wherein the capacitive coupled reply signal modulated with the authentication data is transmitted through the body of the user of the wearable device, wherein the capacitive sensor transceiver circuitry is configured to receive another capacitive coupled signal from the host device modulated with information including a confirmation indicating a successful authentication of the wearable device with the host device and indicating that the host device is ready for operation, and wherein in response to the received confirmation, the processing circuitry causes the wearable device to stop transmitting the authentication data.

2. The wearable device of claim 1, wherein:
the capacitive sensor transceiver circuitry is configured to communicate, using capacitive coupled signaling, with a point of sales (POS) terminal to process a transaction.

3. The wearable device of claim 1, comprising:
a display screen to present information to the user.

4. The wearable device of claim 1, wherein:
the wearable device is a smartwatch worn on a wrist of the user.

5. The wearable device of claim 1, wherein:
the wearable device is attached to a belt worn by the user.

6. The wearable device of claim 1, wherein:
the wearable device is included in a shoe worn by the user.

7. The wearable device of claim 1, wherein:
the wearable device is included in an article which is attached to the user.

8. The wearable device of claim 1, comprising:
at least one other sensor configured to collect sensor data.

9. The wearable device of claim 8, wherein:
the at least one other sensor is configured to measure a biological parameter of the user.

10. The wearable device of claim 9, wherein:
the biological parameter of the user includes a temperature of the user.

11. The wearable device of claim 9, wherein:
the biological parameter of the user includes a blood pressure of the user.

12. The wearable device of claim 9, wherein:
the biological parameter of the user includes a body pulse rate of the user.

13. The wearable device of claim89, wherein:
the at least one other sensor is configured to measure a motion parameter of the user.

14. A method performed by a wearable device for capacitive coupled communications, the method includes:
detecting, by the wearable device, a signal sent from a host device through a user's body using a capacitive coupling channel, the received signal modulated with a request to authenticate the wearable device with the host device, wherein the signal is an electrical signal;

responsive to detecting the signal sent from the host device, transmitting, by the wearable device, a reply signal modulated with authentication data that includes encrypted identification information stored in memory of the wearable device identifying the wearable device and password information stored in memory of the wearable device to authenticate the wearable device at the host device, wherein the reply signal is transmitted through the user's body using capacitive coupling; and receiving, by the wearable device, a confirmation signal from the host device modulated with information confirming a successful authentication of the wearable device with the host device and indicating that the host device is ready for operation, and wherein in response to the received confirmation, the wearable device stops transmitting the authentication data.

15. The method of claim 14, comprising:
responsive to receiving the confirmation signal, stopping, by the wearable device, transmission of the authentication data.

16. The method of claim 14, comprising:
communicating, using capacitive coupled signaling, with a point of sales (POS) terminal to process a transaction.

17. The method of claim 16, wherein communicating, using capacitive coupled signaling, with a point of sales (POS) terminal to process a transaction includes sending authentication information to the POS terminal for verification.

18. The method of claim 16, wherein communicating, using capacitive coupled signaling, with a point of sales (POS) terminal to process a transaction includes:
receiving, by the wearable device, confirmation from the POS terminal indicating a successful verification of the authentication information.

19. The method of claim 16, comprising:
receiving from the host device an authorization for the wearable device to spend up to a certain amount of money.

20. The wearable device of claim 1, wherein:
the capacitive coupled signal has a frequency between one kilohertz and 500 kilohertz.

* * * * *